(12) United States Patent
Nishino et al.

(10) Patent No.: US 9,409,790 B2
(45) Date of Patent: *Aug. 9, 2016

(54) TITANIUM OXIDE STRUCTURE AND POROUS TITANIUM OXIDE COMPOSITION

(75) Inventors: Hitoshi Nishino, Osaka (JP); Ryoichi Nishida, Osaka (JP); Hiroaki Matsuyoshi, Osaka (JP); Hiroki Sakamoto, Osaka (JP); Haruo Tomita, Osaka (JP); Hidekazu Hayama, Kyoto (JP); Minoru Tabuchi, Kyoto (JP); Nobuko Ichimura, Kyoto (JP); Tomoe Deguchi, Kyoto (JP)

(73) Assignee: OSAKA GAS CO., LTD., Osaka-shi, Osaka (JP)

(*) Notice: Subject to any disclaimer, the term of this patent is extended or adjusted under 35 U.S.C. 154(b) by 813 days.

This patent is subject to a terminal disclaimer.

(21) Appl. No.: 12/996,546

(22) PCT Filed: Jun. 19, 2009

(86) PCT No.: PCT/JP2009/061220
§ 371 (c)(1),
(2), (4) Date: Dec. 6, 2010

(87) PCT Pub. No.: WO2009/154274
PCT Pub. Date: Dec. 23, 2009

(65) Prior Publication Data
US 2011/0079276 A1    Apr. 7, 2011

(30) Foreign Application Priority Data

Jun. 20, 2008 (JP) .................................. 2008-162428
Jun. 20, 2008 (JP) .................................. 2008-162450

(51) Int. Cl.
*H01L 51/46* (2006.01)
*C01G 23/04* (2006.01)
(Continued)

(52) U.S. Cl.
CPC ................. *C01G 23/04* (2013.01); *B82Y 30/00* (2013.01); *C01G 23/047* (2013.01);
(Continued)

(58) Field of Classification Search
CPC ............ H01L 31/0232; H01L 31/0522; H01L 31/0527; H01L 33/60; Y02E 10/52; H01G 9/2031; Y10S 264/39
See application file for complete search history.

(56) References Cited

U.S. PATENT DOCUMENTS 5,350,644 A    9/1994   Graetzel et al.
6,027,775 A    2/2000   Kasuga et al.
(Continued)

FOREIGN PATENT DOCUMENTS

CN    1498440 A    5/2004
JP    8-015097 A    1/1996
(Continued)

OTHER PUBLICATIONS

Hoyer, Formation of a Titanium Dioxide Nanotube Array, Langmuir, pp. 1411-1413 (1996).*
(Continued)

*Primary Examiner* — Jayne Mershon
(74) *Attorney, Agent, or Firm* — Westerman, Hattori, Daniels & Adrian, LLP

(57) ABSTRACT

With a view to realizing a titanium oxide structure that has a large surface area and enables efficient transfer of ions and electrons by virtue of titanium oxide particles connected to one another, an object of the invention is to develop a material useful as an active material for dye-sensitized solar cells, and a process for producing the material; a porous titanium oxide composition and a process for producing the composition; and a photoelectric conversion element comprising the titanium oxide structure or porous titanium oxide composition.

15 Claims, 10 Drawing Sheets

(51) Int. Cl.
*B82Y 30/00* (2011.01)
*C01G 23/047* (2006.01)
*C01G 23/053* (2006.01)
*H01G 9/20* (2006.01)

(52) U.S. Cl.
CPC ........... *C01G 23/053* (2013.01); *H01G 9/2031* (2013.01); *C01P 2004/03* (2013.01); *C01P 2004/04* (2013.01); *C01P 2004/13* (2013.01); *C01P 2004/62* (2013.01); *C01P 2004/64* (2013.01); *C01P 2006/12* (2013.01); *C01P 2006/14* (2013.01); *C01P 2006/40* (2013.01); *H01G 9/2059* (2013.01); *Y02E 10/542* (2013.01); *Y02P 70/521* (2015.11); *Y10T 428/298* (2015.01); *Y10T 428/2927* (2015.01); *Y10T 428/2975* (2015.01); *Y10T 428/2982* (2015.01)

(56) References Cited

U.S. PATENT DOCUMENTS

| | | | |
|---|---|---|---|
| 6,683,244 B2 * | 1/2004 | Fujimori et al. | 136/263 |
| 2004/0074532 A1 | 4/2004 | Ikeda et al. | |
| 2005/0072458 A1 * | 4/2005 | Goldstein | 136/251 |
| 2007/0175510 A1 * | 8/2007 | Morooka et al. | 136/263 |
| 2008/0118753 A1 * | 5/2008 | Poulin et al. | 428/372 |
| 2010/0255583 A1 * | 10/2010 | Tian | 435/402 |

FOREIGN PATENT DOCUMENTS

| | | |
|---|---|---|
| JP | 2002-248163 A | 9/2002 |
| JP | 2003-055841 A | 2/2003 |
| JP | 2003-123860 A | 4/2003 |
| JP | 2004-235240 A | 8/2004 |
| JP | 2004-319661 A | 11/2004 |
| JP | 2006-063440 A | 3/2006 |
| JP | 2007-130267 A | 5/2007 |
| WO | 2007/028972 A1 | 3/2007 |
| WO | WO 2007/028972 * | 3/2007 |

OTHER PUBLICATIONS

Kavan et al., Qunatum Size Effects in Nanocrystalline Semiconductor TiO2 Layers Prepared by Anodic Oxidative Hydrolysis of TiCl3, Journal of Physical Chemistry, vol./Issue 97, pp. 9493-9498 (1993).*
Supplementary European Search Report dated May 2, 2011, issued in corresponding European Patent Application No. 09766722.4.
Miao, Lei et al.; "Hearing-sol-gel template process for the growth of TiO2 nanorods with rutile and anatase structure"; Applied Surface Science, Elsevier, Amsterdam, NL, vol. 238, Jan. 1, 2004, pp. 175-179 ZP002413389. cited in Supplementary European Search Report.
Dominik Eder, Ian A. Kinloch and Alan H. Windle, "Pure rutile nanotubes", The Royal Society of Chemistry 2006, Communication, Chem. Commun., 2006, 1448-1450. 3 pages.
Jiang, K.J. "Dye-sensitized Solar Cells Using Porous TiO2 Electrode With Brookite-based Nanocrystalites," Abstracts of the Autumn Meeting of the Electrochemical Society of Japan, 2002, 68, p. 138, cited in spec.
Adachi, M. et al "Formation of Titanium Oxide Nanotubes and Application to Dye-Sensitized Solar Cells," Abstracts of the Meeting of the Electrochemical Society of Japan, 2001, 68, p. 112, cited in spec.
International Search Report of PCT/JP2009/061220, mailing date Sep. 29, 2009.
Eder, Dominik et al., "Morphology control of CNT-TiO2 hybrid materials and rutile nanotubes", Journal of Materials Chemistry, 2008, vol. 18, pp. 2036-2043.
Office Action dated Mar. 10, 2010, issued in counterpart Japanese Patent Application No. 2009-146358, with English translation. (5 pages).
Office Action dated Jun. 2, 2010, issued in counterpart Japanese Patent Application No. 2009-146358, with English translation. (5 pages).

* cited by examiner

Transparent Electrode
Glass Substrate

TITANIUM OXIDE STRUCTURE AND POROUS TITANIUM OXIDE COMPOSITION

TECHNICAL FIELD

The present invention relates to a titanium oxide composite for use in photoelectric conversion elements, such as dye-sensitized solar cells, and a process for producing the titanium oxide composite; a porous titanium oxide composition and a process for producing the porous titanium oxide composition; and a photoelectric conversion element comprising the titanium oxide composite or porous titanium oxide composition.

BACKGROUND ART

Solar cells have attracted attention as environmentally friendly power-generation devices. Silicon-based semiconductors utilizing p-n junctions are widely known as such solar cells. However, the manufacture of silicon-based solar cells requires high vacuum and high temperatures, making it difficult to reduce costs, preventing practical use of silicon-based solar cells.

With an expectation for the development of lower-cost solar cells, Graetzel et al. reported dye-sensitized solar cells wherein titanium dioxide or the like that is modified with a dye is used as an active electrode (see Patent Literature 1). Dye-sensitized solar cells have attracted attention as solar cells that can be readily manufactured at low cost.

However, further improvement in the performance of dye-sensitized solar cells is presently required, for example, in terms of the electron conduction of titanium oxide used as an active electrode.

Titanium oxide nanoparticles are generally known to exhibit high performance as an active electrode. The use of nanoparticles is intended to provide a large area for a dye that is adsorbed on the titanium oxide, thereby efficiently absorbing incident light. However, the formation of a film of spherical nanoparticles involves the following trade-offs: the presence of an interface between the particles precludes efficient transfer of charge-separated electrons; and the narrow gap between neighboring particles makes the transfer of ions in the electrolytic solution near the nanoparticles difficult, thereby precluding the accompanied transfer of electrons.

Thus, there has been a need for titanium oxide that enables efficient transfer of both electrons and ions as an active electrode for dye-sensitized solar cells.

In view of this problem, cases where titanium oxide in the form of nanowires is used as active electrodes have been reported (see Non-Patent Literatures 1 and 2). However, because these nanowires are only composed of titanium oxide having a flat surface, dyes cannot be deposited thereon in an amount sufficient to absorb incident light; thus, there has been a need for an increased current density.

Patent Literature 2 investigates an active electrode wherein a titanium oxide coating is formed on carbon tubes whose lengthwise direction is arranged substantially perpendicular to the film-formation surface of a substrate. This is done in order to improve the conductivity of a current flowing in the lamination direction of films, thereby providing increased electron conductivity in the titanium oxide and efficient transfer of electrons from the titanium oxide to the electrode. However, the active electrode of Patent Literature 2 has the problem of an increased leakage current, possibly due to the difficulty in forming a uniform titanium oxide coating.

Patent Literature 3 teaches mixing an active material, i.e., oxide particles, with carbon nanotubes. However, if the carbon nanotubes are not sufficiently coated with the active material oxide, the leakage current will increase, resulting in the problem of reduced power-generation efficiency.

CITATION LIST

Patent Literature

[PTL 1] Japanese Examined Patent Publication No. 1996-15097
[PTL 2] Japanese Unexamined Patent Publication No. 2004-319661
[PTL 3] Japanese Unexamined Patent Publication No. 2003-123860

Non-Patent Literature

[NPL 1] Abstracts of the Meeting of the Electrochemical Society of Japan, 2001, the 68th, p. 112
[NPL 2] Abstracts of the Autumn Meeting of the Electrochemical Society of Japan, 2002, p. 138

SUMMARY OF INVENTION

Technical Problem

With a view to realizing a titanium oxide structure that has a large surface area and enables efficient transfer of ions and electrons, an object of the invention is to develop a material useful as an active material for dye-sensitized solar cells, and a process for producing the material; a porous titanium oxide composition and a process for producing the composition; and a photoelectric conversion element comprising the titanium oxide structure or porous titanium oxide composition.

Solution to Problem

The present inventors conducted extensive research in view of the foregoing object. Consequently, the present inventors found that a titanium oxide structure that has a large surface area and enables efficient transfer of ions and electrons can be provided by virtue of titanium oxide particles that are connected to one another. The present inventors also found that a mixture of the titanium oxide structure and titanium oxide particles is preferable as an active material for dye-sensitized solar cells, because the mixture improves photoelectric conversion efficiency. The invention has been accomplished based on these findings. Features of the invention are as summarized below.

Item 1. A rod-like, tubular, or fibrous titanium oxide structure comprising
titanium oxide particles (1a) connected to one another.
Item 2. The titanium oxide structure according to Item 1, wherein the titanium oxide particles (1a) have a mean particle size of 1 to 200 nm.
Item 3. The titanium oxide structure according to Item 1 or 2, wherein the titanium oxide structure has a mean diameter of 5 to 500 nm perpendicular to a long axis, a mean long-axis length of 0.1 to 1,000 μm, and a mean aspect ratio of 3 to 200,000.
Item 4. The titanium oxide structure according to any one of Items 1 to 3, wherein the titanium oxide structure has a powder resistance of $3 \times 10^6$ Ω·m or less at a pressure of 10 MPa.
Item 5. The titanium oxide structure according to any one of Items 1 to 4, wherein the titanium oxide structure is tubular.

Item 6. The titanium oxide structure according to Item 5, wherein the titanium oxide structure has a thickness of 2 to 500 nm.

Item 7. The titanium oxide structure according to any one of Items 1 to 6, wherein the titanium oxide particles (1a) comprise at least one member selected from the group consisting of anatase titanium oxide, rutile titanium oxide, and brookite titanium oxide.

Item 8. The titanium oxide structure according to Item 7, wherein the titanium oxide particles (1a) further comprise at least one member selected from the group consisting of oxide of titanium (II) and oxide of titanium (III), in addition to the at least one member selected from the group consisting of anatase titanium oxide, rutile titanium oxide, and brookite titanium oxide.

Item 9. The titanium oxide structure according to any one of Items 1 to 8, wherein the titanium oxide particles (1a) comprise a titanium oxide having a crystalline form of a Magneli-phase structure.

Item 10. The titanium oxide structure according to any one of Items 1 to 9, wherein the titanium oxide structure has a specific surface area of 20 $m^2/g$ or more.

Item 11. A process for producing the titanium oxide structure of any one of Items 1 to 10, comprising the steps of:

(A) forming a covering layer comprising titanium oxide particles (1a) connected to one another on a surface of a rod-like or fibrous nanoscale carbon by performing a precipitation reaction from a fluorotitanate complex, thereby preparing nanoscale carbon covered with titanium oxide; and (B) removing the nanoscale carbon present in the nanoscale carbon covered with titanium oxide.

Item 12. The process for producing the titanium oxide structure according to Item 11, wherein 70 to 100% of the surface of the nanoscale carbon is covered with the titanium oxide, as measured by electron microscopic observation.

Item 13. The process for producing the titanium oxide structure according to Item 11 or 12, wherein an element ratio (C/Ti) of carbon and titanium on the surface of the nanoscale carbon covered with titanium oxide is 0/100 to 70/30 (atomic ratio), as measured by X-ray photoelectron spectroscopic analysis.

Item 14. The process for producing the titanium oxide structure according to any one of Items 11 to 13, wherein the rod-like or fibrous nanoscale carbon has a mean diameter of 1 to 100 nm perpendicular to a long axis, a mean long-axis length of 0.1 to 1,000 μm, and a mean aspect ratio of 5 to 1,000,000.

Item 15. The process for producing the titanium oxide structure according to any one of Items 11 to 14, wherein the rod-like or fibrous nanoscale carbon is nanoscale carbon tubes.

Item 16. A porous titanium oxide composition comprising a mixture of:

(1) the titanium oxide structure of any one of Items 1 to 10; and (2) titanium oxide particles.

Item 17. The porous titanium oxide composition according to Item 16, comprising a mixture of 0.1 to 90 wt % of the titanium oxide structure (1) and 10 to 99.9 wt % of the titanium oxide particles (2).

Item 18. The porous titanium oxide composition according to Item 16 or 17, wherein the titanium oxide particles (2) have a mean particle size of 1 to 500 nm.

Item 19. The porous titanium oxide composition according to any one of Items 16 to 18, wherein the titanium oxide particles (2) comprise at least one member selected from the group consisting of anatase titanium oxide, rutile titanium oxide, and brookite titanium oxide.

Item 20. The porous titanium oxide composition according to any one of Items 16 to 19, wherein the titanium oxide composition has a specific surface area of 30 $m^2/g$ or more.

Item 21. The porous titanium oxide composition according to any one of Items 16 to 20, comprising 40 to 100% of pores having a pore size of 5 to 50 nm of a total volume of pores.

Item 22. A process for producing the porous titanium oxide composition of any one of Items 16 to 21, comprising the steps of:

(A1) forming a covering layer comprising titanium oxide particles (1a) connected to one another on a surface of a rod-like or fibrous nanoscale carbon by performing a precipitation reaction from a fluorotitanate complex, thereby preparing nanoscale carbon covered with titanium oxide;

(B1) removing the nanoscale carbon present in the nanoscale carbon covered with titanium oxide obtained in Step (A1), thereby preparing a titanium oxide structure (1); and (C1) mixing the titanium oxide structure (1) obtained in Step (B1) with titanium oxide particles (2).

Item 23. A process for producing the porous titanium oxide composition of any one of Items 16 to 21, comprising the steps of:

(A2) forming a covering layer comprising titanium oxide particles (1a) connected to one another on a surface of a rod-like or fibrous nanoscale carbon by performing a precipitation reaction from a fluorotitanate complex, thereby preparing nanoscale carbon covered with titanium oxide;

(B2) mixing the nanoscale carbon covered with titanium oxide obtained in Step (A2) with titanium oxide particles (2); and (C2) removing the nanoscale carbon present in the nanoscale carbon covered with titanium oxide in the mixture obtained in Step (B2).

Item 24. A photoelectric conversion element comprising a dye deposited on a surface of an active material, the active material comprising the titanium oxide structure of any one of claims 1 to 10, or the porous titanium oxide composition of any one of Items 16 to 21.

Advantageous Effects of Invention

The invention provides a titanium oxide structure that has a large surface area and enables efficient transfer of ions and electrons, and a process for producing the titanium oxide structure; a porous titanium oxide composition and a process for producing the composition; and a photoelectric conversion element comprising the titanium oxide structure or porous titanium oxide composition.

Figure 6:
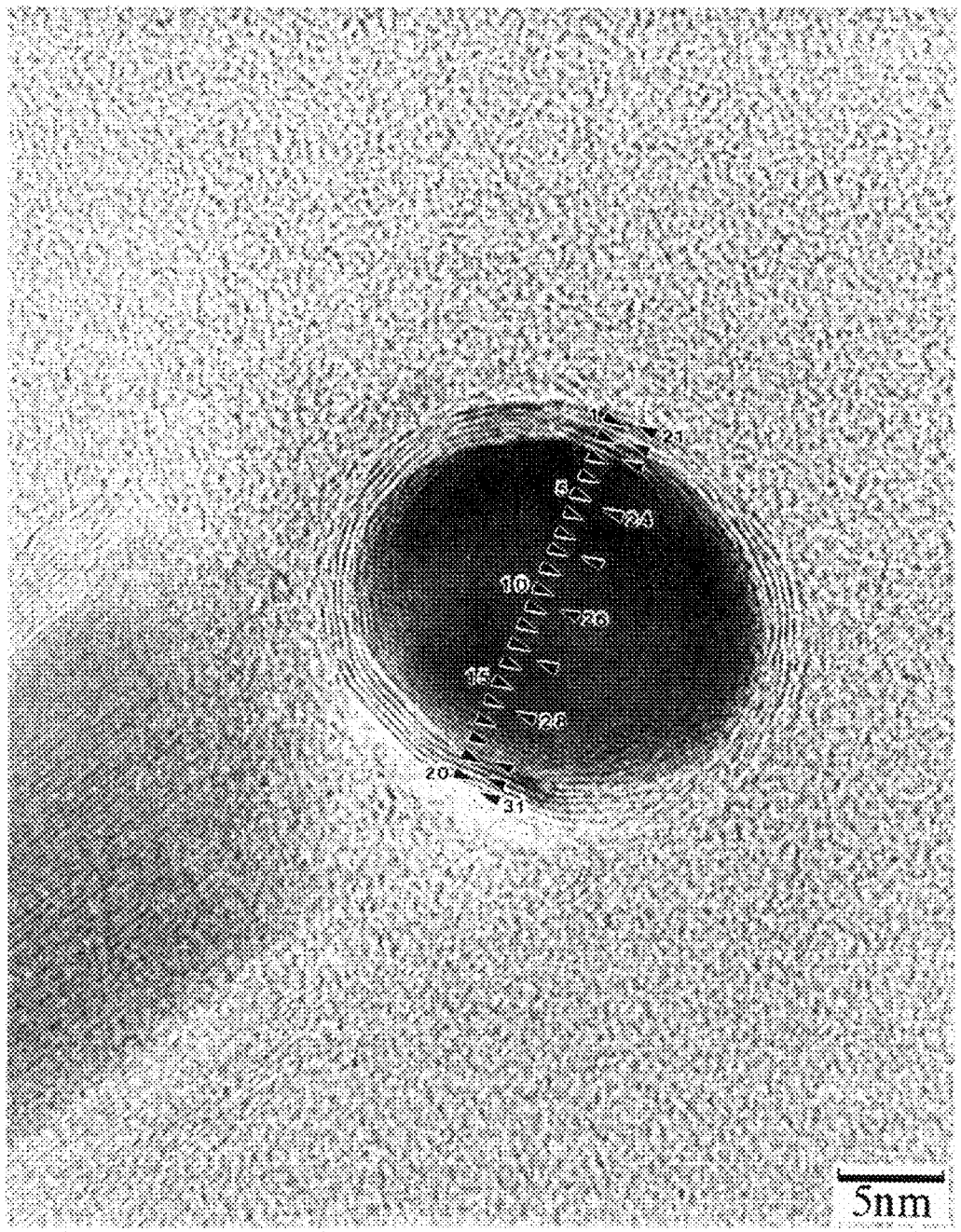
FIG. 6 is a transmission electron microscope (TEM) photograph of a cross section of a single fiber of the iron-carbon composite obtained in Example 1 of Japanese Unexamined Patent Publication No. 2002-338220.

The black triangles (▲) shown in the photograph of FIG. 6 represent points of EDX measurement for composition analysis.

Figure 7:
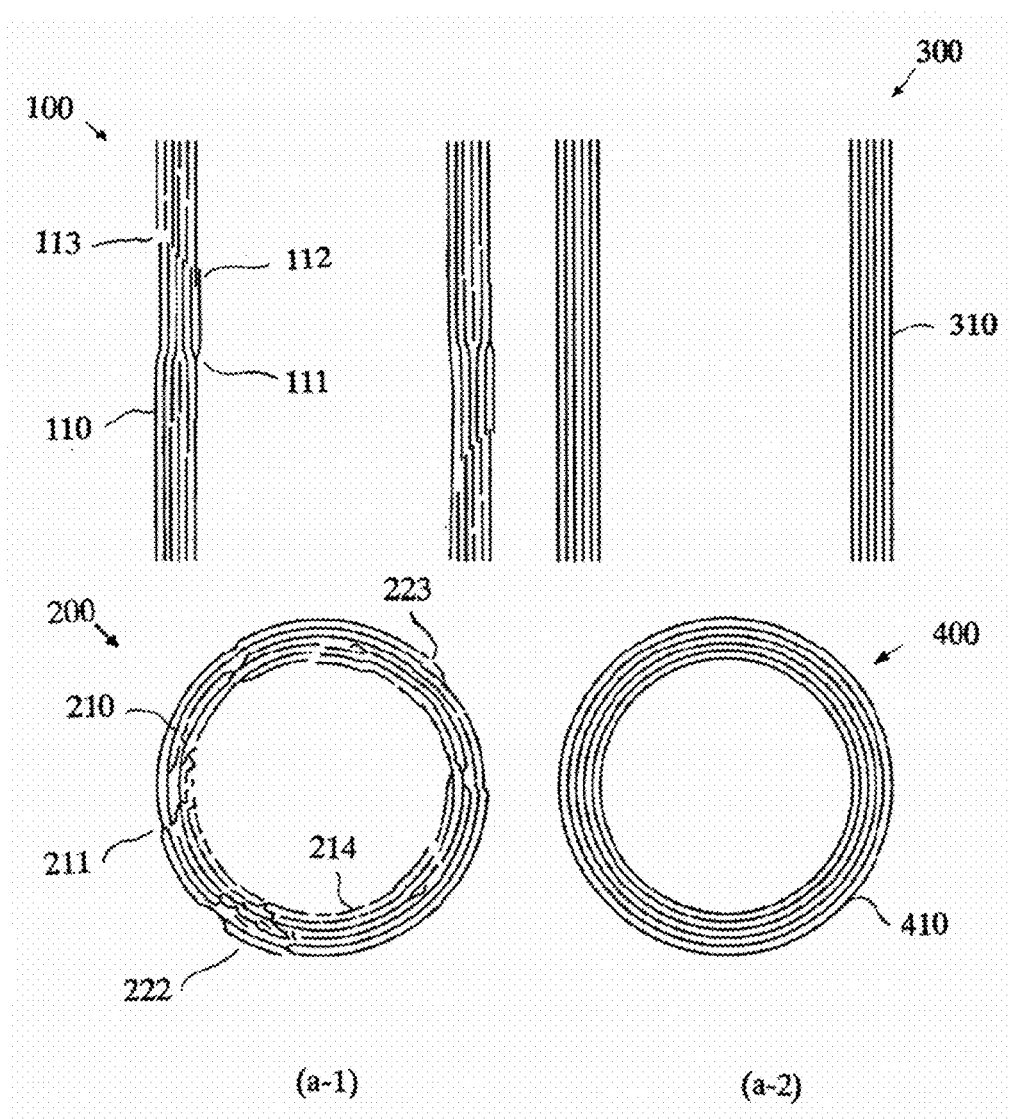

FIG. 7 shows schematic diagrams of TEM images of carbon tubes; FIG. 7(a-1) is a schematic diagram of a TEM image of a cylindrical nanoflake carbon tube, and FIG. 7(a-2) is a schematic diagram of a TEM image of a nested multi-walled carbon nanotube.

Figure 8:
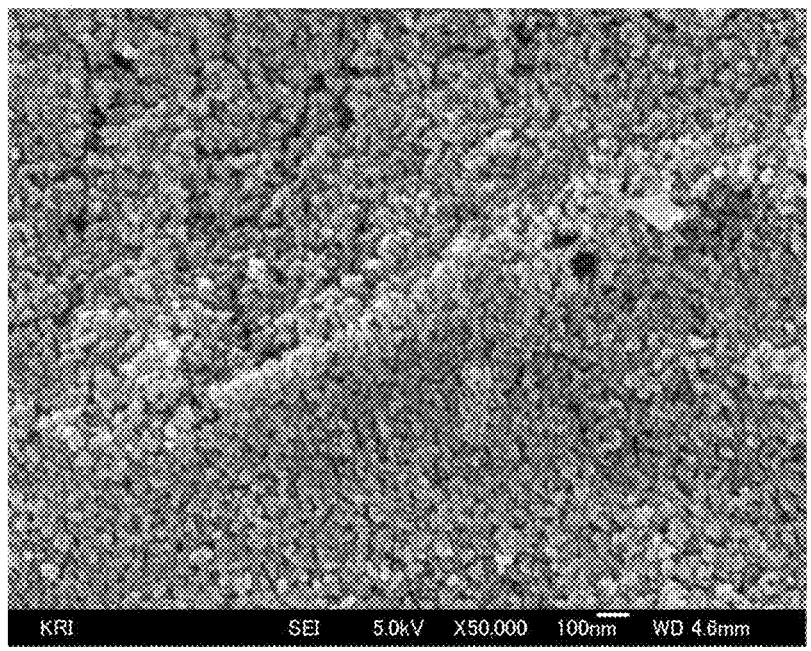

FIG. 8 is a scanning electron microscope (SEM) photograph showing the surface morphology of a titanium oxide composition of the invention.

Figure 9:
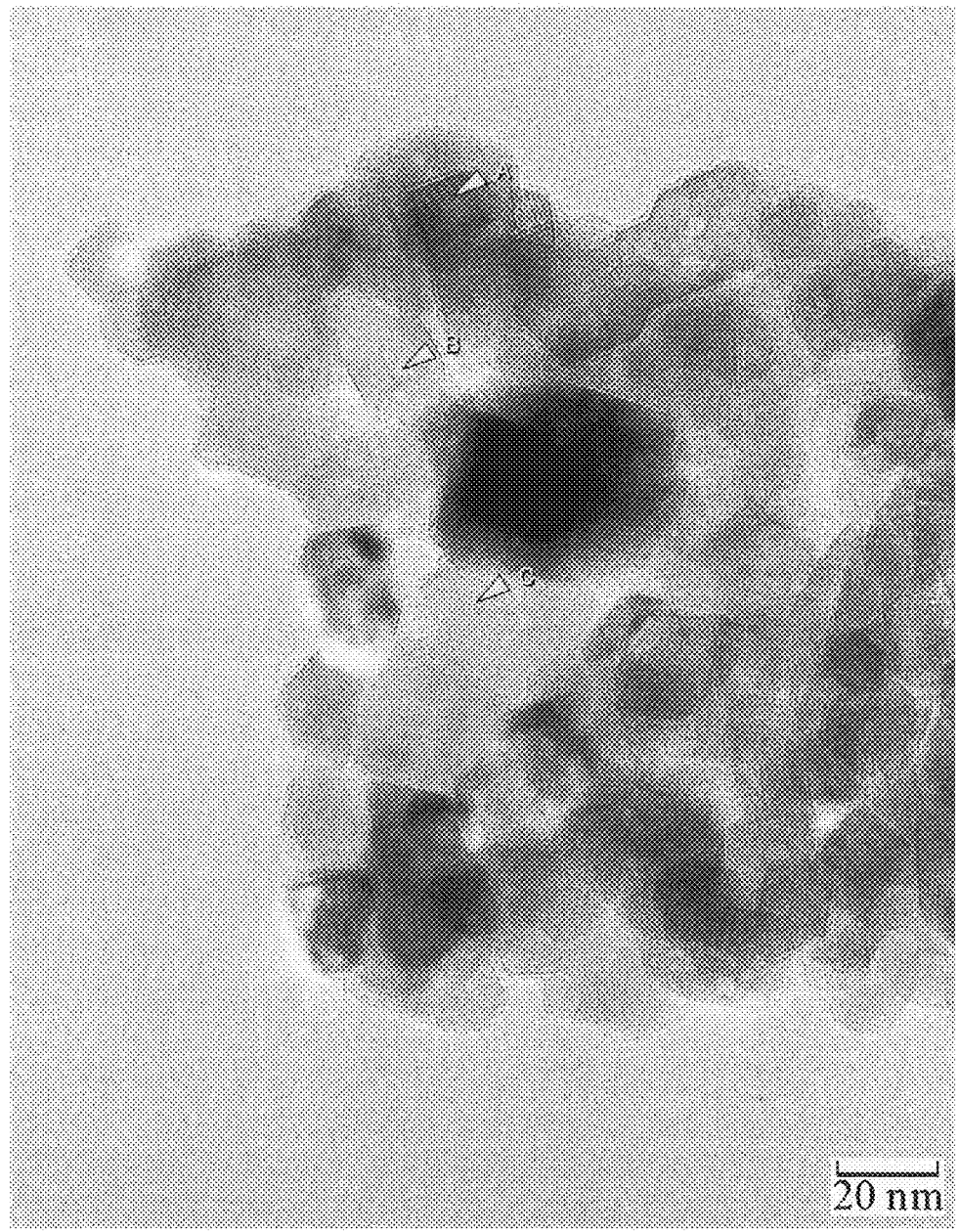

FIG. 9 is a transmission electron microscope (TEM) photograph of an end portion of the titanium oxide structure of Example 1.

Figure 10:
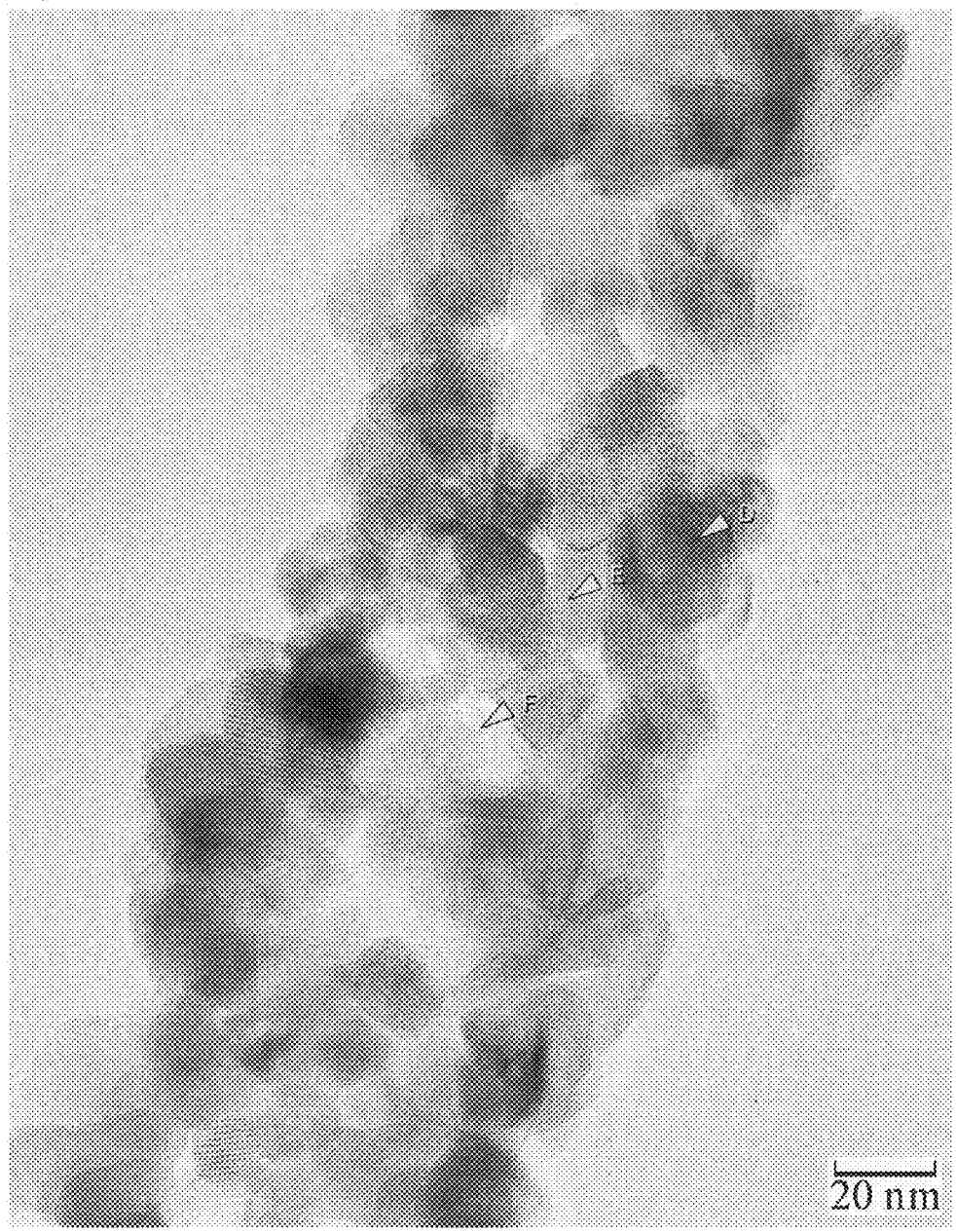

FIG. 10 is a transmission electron microscope (TEM) photograph of a central portion of the titanium oxide structure of Example 1.

DESCRIPTION OF EMBODIMENTS

1. Titanium Oxide Structure (1)

The titanium oxide structure (1) of the invention comprises titanium oxide particles (1a) that are connected to one another. The structure of the titanium oxide structure is rod-like, tubular, or fibrous. Among the rod-like, tubular, and fibrous titanium oxide structures (1) of the invention, the tubular titanium oxide structure (1) is preferable because of its large surface area. As used herein, the expression "connected to one another" means that adjacent titanium oxide particles (1a) are in close contact with each other; this state is not obtained simply by mixing.

Figure 1:
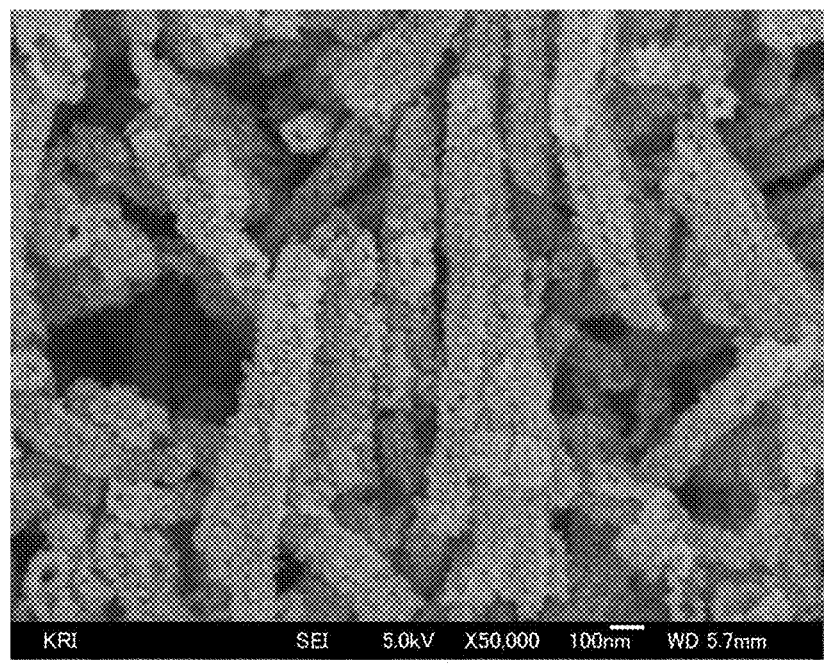
FIG. 1 is a scanning electron microscope (SEM) photograph showing the surface morphology of a titanium oxide structure of the invention, wherein titanium oxide particles (1a) are connected to one another.
Figure 2:
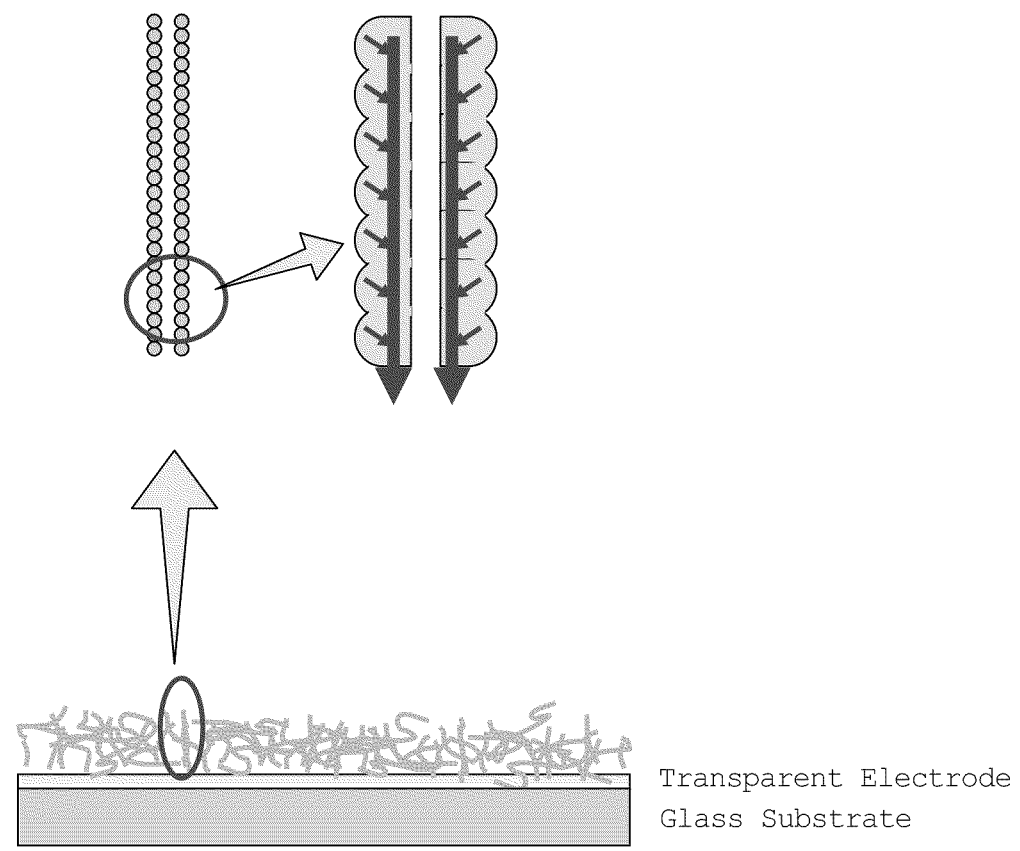
FIG. 2 is a schematic diagram illustrating the transfer of electrons in the titanium oxide structure of the invention, wherein titanium oxide particles (1a) are connected to one another.

In the invention, the titanium oxide particles (1a) are connected so as to form a rod-like, tubular, or fibrous shape, forming the titanium oxide structure (1). Thus, as shown in FIG. 1, fine irregularities are present on the surface of the rod-like, tubular, or fibrous titanium oxide structure (1) of the invention. The use of the titanium oxide structure (1) having fine irregularities on the surface for dye-sensitized solar cells allows a large amount of dye to be deposited on the surface, enabling efficient absorption of incident light. This leads to efficient production of electrons, and, as shown in FIG. 2, because adjacent titanium oxide particles (1a) are in close contact with each other, the electrons can be efficiently transferred to the transparent electrode through the adjacent titanium oxide particles (1a).

Figure 3:
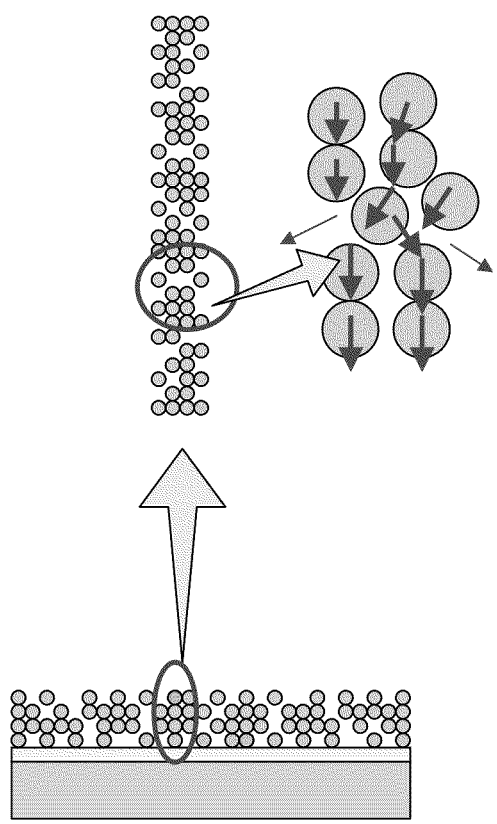
FIG. 3 is a schematic diagram illustrating the transfer of electrons that occurs when a paste of titanium oxide wherein titanium oxide particles (1a) are not formed into a rod-like, tubular, or fibrous shape is applied to a substrate.

Note that, as shown in FIG. 3, if a paste of titanium oxide wherein titanium oxide particles (1a) are not formed into a rod-like, tubular, or fibrous shape is applied to a substrate, the grain-boundary resistance will increase, making the flow of electrons poor, and the diffusion of an electrolytic solution in the mesoporous structure will also deteriorate.

1-1. Titanium Oxide Particles (1a)

There are no limitations on the crystal structure of the titanium oxide particles (1a). The titanium oxide particles (1a) preferably comprise at least one member selected from the group consisting of anatase titanium oxide, rutile titanium oxide, and brookite titanium oxide. The titanium oxide particles (1a) comprising anatase titanium oxide are preferable because of their high photoactivity. The crystal structure of the titanium oxide particles (1a) can be measured by, e.g., X-ray diffractometry or Raman spectroscopic analysis. The titanium oxide particles (1a) preferably further comprise at least one titanium oxide selected from the group consisting of oxide of titanium (II) and oxide of titanium (III), in addition to at least one member selected from the group consisting of anatase titanium oxide, rutile titanium oxide, and brookite titanium oxide.

The titanium oxide particles (1a) preferably additionally comprise a titanium oxide having a crystalline form of a Magneli-phase structure. Although the specific structure is not clear, the titanium oxide having the crystalline form of a Magneli-phase structure is represented by the formula, $Ti_nO_{2n-1}$ (n is 4 to 10), and has a conductivity substantially equal to that of metals. The conductivity of the titanium oxide structure can be improved by incorporating the titanium oxide having the crystalline form of a Magneli-phase structure into the titanium oxide particles (1a).

The mean particle size of the titanium oxide particles (1a) is preferably 1 to 200 nm, and more preferably 1 to 50 nm, in order to adsorb a greater amount of dye and absorb a greater amount of light. However, the titanium oxide particles (1a) may also incorporate titanium oxide particles having a greater particle size and, thus, greater light scattering in order to achieve a light-confinement effect inside a cell. The mean particle size can be measured by, e.g., electron microscopic (SEM or TEM) observation.

1-2. Titanium Oxide Structure (1)

The titanium oxide structure (1) of the invention preferably has a specific surface area of 20 $m^2/g$ or more, more preferably 70 $m^2/g$ or more, and still more preferably 80 $m^2/g$ or more, in order to allow a greater amount of dye to be deposited thereon, and efficiently absorb incident light. It is preferable that the specific surface area be larger; although the upper limit thereof is not limited, it is about 3,000 $m^2/g$. The specific surface area can be measured by, e.g., the BET method.

To provide the titanium oxide structure (1) of the invention with a sufficient surface area and efficient transfer of electrons, the titanium oxide structure (1) preferably has a mean diameter of 5 to 500 nm perpendicular to the long axis, a mean long-axis length of 0.1 to 1,000 μm, and a mean aspect ratio (mean long-axis length/mean diameter perpendicular to the long axis) of 3 to 200,000; more preferably has a mean diameter of 5 to 500 nm perpendicular to the long axis, a mean long-axis length of 0.1 to 1,000 μm, and a mean aspect ratio (mean long-axis length/mean diameter perpendicular to the long axis) of 3 to 5000; and still more preferably has a mean diameter of 7 to 300 nm perpendicular to the long axis, a mean long-axis length of 1 to 50 μm, and a mean aspect ratio of 10 to 3,000. In the invention, when a tubular titanium oxide structure is used as the titanium oxide structure (1), the diameter thereof means the outside diameter. The mean diameter, the mean length, and the mean aspect ratio of the titanium oxide structure (1) can be measured by, e.g., electron microscopic (SEM) observation.

The titanium oxide structure (1) of the invention preferably has a powder resistance at 10 MPa of $3 \times 10^6$ Ω·m or less, and more preferably $1 \times 10^5$ Ω·m or less, in order to generate a larger amount of current. It is preferable that the powder resistance be lower; although the lower limit thereof is not limited, it is about 0.1 Ω·m. The powder resistance of the titanium oxide structure can be measured by, e.g., processing the titanium oxide structure into a 0.3 mm-thick tabular shape at a pressure of 10 MPa, applying a voltage of 1 V across the pellets, and measuring the value of the current flow.

When the titanium oxide structure (1) of the invention is tubular, the thickness thereof is preferably about 2 to 500 nm, and more preferably about 5 to 200 nm, in order to prevent the occurrence of leakage current. The term "thickness" represents the difference between the outside diameter and inside diameter of the tubular titanium oxide structure (1). The thickness of the titanium oxide structure (1) of the invention can be measured by, e.g., electron microscopic (SEM or TEM) observation.

2. Process for Producing Titanium Oxide Structure (1)

The titanium oxide structure (1) of the invention is obtained according to the following steps:

(A) forming a covering layer comprising titanium oxide particles (1a) connected to one another on a surface of a rod-like or fibrous nanoscale carbon by performing a precipitation reaction from a fluorotitanate complex, thereby preparing nanoscale carbon covered with titanium oxide; and (B) removing the nanoscale carbon present in the nanoscale carbon covered with titanium oxide.

2-1. Step (A)

In Step (A), a covering layer comprising titanium oxide particles (1a) connected to one another is formed on a surface of a rod-like or fibrous nanoscale carbon by a precipitation reaction from a fluorotitanate complex, thereby preparing nanoscale carbon covered with titanium oxide.

The covering layer comprising titanium oxide particles (1a) connected to one another can be formed on the surface of the nanoscale carbon according to a sol-gel process using a titanium alkoxide as the starting material, or a wet process using titanium tetrachloride as the starting material. However, it is preferable to employ the method wherein titanium oxide is precipitated from a fluorotitanate complex by the precipitation reaction.

The method specifically comprises, for example, treating the rod-like or fibrous nanoscale carbon with an acid such as nitric acid, sulfuric acid, or hydrochloric acid; dispersing the treated nanoscale carbon in a solvent containing a dispersant; and adding thereto a fluorotitanate complex and a fluoride-ion scavenger, such as boric acid or aluminium chloride, to precipitate titanium oxide (1a).

Examples of fluorotitanate complexes include, but are not limited to, ammonium hexafluorotitanate, hexafluorotitanic acid, and potassium hexafluorotitanate.

Examples of solvents include, but are not limited to, solvents that dissolve the fluorotitanate complex, such as water, and a solvent mixture of water and an alcohol.

Examples of dispersants include anionic dispersants such as sodium naphthalene sulfonate formaldehyde condensate dispersants, polycarboxylic acid salt dispersants, maleic acid-α-olefin copolymer salt dispersants, and anionic surfactants; cationic dispersants such as quarternary ammonium salt dispersants and alkylamine salts; nonionic dispersants such as cellulose dispersants, polyvinyl alcohol dispersants, and polyether dispersants; and other dispersants such as ampholytic surfactants. Among the above, nonionic dispersants are preferable, and polyether dispersants are more preferable.

Nanoscale carbon usable in Step (A) is described in detail below.

Nanoscale Carbon

There are no limitations on the rod-like or fibrous nanoscale carbon used in the invention; however, nanoscale carbon tubes are preferably used. The nanoscale carbon tubes are preferably formed of a conductive material.

In order to subsequently enable the production of a titanium oxide structure that is as fine as possible, has a large surface area, and wherein titanium oxide (1a) are connected over a long length, the rod-like or fibrous nanoscale carbon preferably has a mean diameter of about 1 to 100 nm perpendicular to the long axis, a mean long-axis length of about 0.1 to 1,000 μm, and a mean aspect ratio of about 5 to 1,000,000; more preferably has a mean diameter of about 1 to 100 nm perpendicular to the long axis, a mean long-axis length of about 0.1 to 1,000 μm, and a mean aspect ratio of about 5 to 10,000; and still more preferably has a mean diameter of about 1 to 50 nm perpendicular to the long axis, a mean long-axis length of about 1 to 50 μm, and a mean aspect ratio of about 10 to 10,000. The mean diameter perpendicular to the long axis, the mean long-axis length, and the mean aspect ratio can be measured by electron microscopic (SEM or TEM) observation.

[Nanoscale Carbon Tubes]

The nanoscale carbon tubes for use in the present invention refer to carbon tubes with nanoscale diameters, which may encapsulate iron or the like in their interiors.

Examples of such nanoscale carbon tubes include:

(i) single-walled carbon nanotubes or multi-walled carbon nanotubes;

(ii) amorphous nanoscale carbon tubes developed by the present applicant;

(III) nanoflake carbon tubes;

(iv) iron-carbon composites each composed of (a) a carbon tube selected from the group consisting of nanoflake carbon tubes and nested multi-walled carbon nanotubes, and (b) iron carbide or iron, wherein the iron carbide or iron (b) fills 10 to 90% of the internal space of the carbon tube (a); and (v) a mixture of two or more thereof.

<Carbon Nanotubes>

The carbon nanotubes (I) are hollow carbon substances in which graphite sheets (i.e., the carbon atom layers of graphite structures or graphene sheets) are rolled to form tubes, and have a diameter in the nanoscale range, and walls thereof have a graphite structure. The carbon nanotubes (I) in which the wall is made of a single graphite sheet closed to form a tube are called single-walled carbon nanotubes, while those comprising a plurality of graphite sheets each closed to form a tube and nested in one another are called nested multi-walled carbon nanotubes. In the present invention, both single-walled carbon nanotubes and nested multi-walled carbon nanotubes can be used.

The single-walled carbon nanotubes usable in the invention preferably have a mean diameter of about 1 to 10 nm perpendicular to the long axis, a mean long-axis length of about 0.1 to 500 μm, and a mean aspect ratio of about 10 to 500,000; more preferably have a mean diameter of about 1 to 10 nm perpendicular to the long axis, a mean long-axis length of about 0.1 to 500 μm, and a mean aspect ratio of about 10 to 50,000; still more preferably have a mean diameter of about 1 to 5 nm perpendicular to the long axis, a mean long-axis length of about 1 to 100 μm, and a mean aspect ratio of about 15 to 30,000; and even more preferably have a mean diameter of about 1 to 2 nm perpendicular to the long axis, a mean long-axis length of about 1 to 20 μm, and a mean aspect ratio of about 20 to 20,000.

The nested multi-walled carbon nanotubes usable in the invention preferably have a mean diameter of about 1 to 100 nm perpendicular to the long axis, a mean long-axis length of about 0.1 to 500 μm, and a mean aspect ratio of about 1 to 500,000; more preferably have a mean diameter of about 1 to 100 nm perpendicular to the long axis, a mean long-axis length of about 0.1 to 500 µm, and a mean aspect ratio of about 5 to 10,000; still more preferably have a mean diameter of about 1 to 50 nm perpendicular to the long axis, a mean long-axis length of about 1 to 100 µm, and a mean aspect ratio of about 10 to 10,000; and even more preferably have a mean diameter of about 1 to 40 nm perpendicular to the long axis, a mean long-axis length of about 1 to 20 µm, and a mean aspect ratio of about 10 to 10,000.

<Amorphous Nanoscale Carbon Tubes>

The amorphous nanoscale carbon tubes (II) are nanoscale carbon tubes of an amorphous structure that are disclosed in WO 00/40509 (Japanese Patent No. 3,355,442), have a main skeleton consisting of carbon, and have a diameter of 0.1 to 1000 nm. The amorphous nanoscale carbon tubes (II) have an interlayer spacing (d002) between hexagonal carbon layers of 3.54 Å or more, and preferably 3.7 Å or more, a diffraction angle (2θ) of 25.1 degrees or less, and preferably 24.1 degrees or less, and a 2θ band half-width of 3.2 degrees or more, and preferably 7.0 degrees or more, as determined by X-ray diffractometry (incident X-ray: CuKα).

The amorphous nanoscale carbon tubes (II) are obtained by an excitation treatment of a heat-decomposable resin having a decomposition temperature of 200 to 900° C., such as, for example, polytetrafluoroethylene, polyvinylidene chloride, polyvinylidene fluoride, or polyvinyl alcohol, in the presence of a catalyst comprising at least one chloride of a metal such as magnesium, iron, cobalt, or nickel.

The heat-decomposable resin as the starting material may be in any form, such as films or sheets, powders, or masses. For example, to obtain a carbon material comprising a thin layer of amorphous nanoscale carbon tubes formed on a substrate, a heat-decomposable resin may be applied to or mounted on a substrate and then subjected to an excitation treatment under suitable conditions.

The excitation treatment can be carried out by, e.g., heating in an inert atmosphere at a temperature that is within the range of about 450 to 1,800° C. and is not lower than the heat decomposition temperature of the starting material; or by plasma-treating at a temperature that is within the range from about room temperature to 3,000° C. and is not lower than the heat decomposition temperature of the starting material.

The amorphous nanoscale carbon tubes (II) usable in the present invention are nanoscale carbon tubes with an amorphous structure, which have a hollow straight shape and highly controlled pores. The tubes usually have a cylindrical or rectangular prism shape, and most of the tubes have at least one uncapped (open) end. In the case where tubes with closed ends are present, most of these tubes have flat ends.

The amorphous nanoscale carbon tubes (II) preferably have a mean outside diameter of about 1 to 100 nm, a mean length of about 0.1 to 1,000 µm, and a mean aspect ratio of about 1 to 1,000,000; more preferably have a mean outside diameter of about 1 to 100 nm, a mean length of about 0.1 to 1,000 µm, and a mean aspect ratio of about 5 to 10,000; and still more preferably have a mean outside diameter of about 1 to 50 nm, a mean length of about 1 to 50 µm, and a mean aspect ratio of about 10 to 10,000.

As used herein, the term "amorphous structure" means a carbonaceous structure consisting of disordered hexagonal carbon layers, in which a large number of graphene sheets are irregularly disposed, as opposed to a graphitic structure consisting of continuous carbon layers of regularly disposed carbon atoms. In view of an image through a transmission electron microscope, which is a typical analytical means, the dimension in the planar direction of the hexagonal carbon layers of the amorphous nanoscale carbon tubes usable in the present invention is smaller than the diameter of the amorphous nanoscale carbon tubes (II). Thus, since the wall of the amorphous nanoscale carbon tubes (II) does not have a graphite structure, but has an amorphous structure consisting of a large number of irregularly distributed minute graphene sheets (hexagonal carbon layers), the outermost hexagonal carbon layer is not continuous but discontinuous over the entire length in the lengthwise direction of each tube. The hexagonal carbon layers constituting the outermost layer have a length of less than 20 nm, and preferably less than 5 nm.

Generally, amorphous carbon causes no X-ray diffraction but shows a broad reflection. In a graphitic structure, hexagonal carbon layers are regularly stacked on top of one another, so that spacings between the hexagonal carbon layers ($d_{002}$) are narrow. Accordingly, the broad reflection shifts towards the high-angle side (2θ) and gradually narrows (has a smaller half-width of the 2θ band). As a result, the reflection can be observed as a $d_{002}$ diffraction band ($d_{002}$=3.354 Å when the layers are regularly stacked on top of one another with a graphitic configuration).

In contrast, an amorphous structure generally does not cause X-ray diffraction as described above, but partially shows very weak coherent scattering. As determined by an X-ray diffractometry (incident X-ray: CuKα) using a diffractometer, the theoretical crystallographic characteristics of the amorphous nano-scale carbon tubes (II) for use in the invention are defined as follows: the spacings between hexagonal carbon layers ($d_{002}$) are 3.54 Å or more, and preferably 3.7 Å or more; the diffraction angle (2θ) is 25.1 degrees or less, and preferably 24.1 degrees or less; and the 2θ band half-width is 3.2 degrees or more, and preferably 7.0 degrees or more.

Typically, the amorphous nanoscale carbon tubes (II) usable in the present invention have a diffraction angle (2θ) determined by X-ray diffraction of 18.9 to 22.6 degrees, spacings between hexagonal carbon layers ($d_{002}$) of 3.9 to 4.7 Å, and a 2θ band half-width of 7.6 to 8.2 degrees.

The term "straight" used to describe the shape of the amorphous nanoscale carbon tubes (II) usable in the present invention refers to shape characteristics such that the ratio $L/L_o$ is 0.9 or more, wherein L is the length of the image of an amorphous nanoscale carbon tube (II) as measured by a transmission electron microscope, and $L_o$ is the length of the amorphous nanoscale carbon tube (II) as extended linearly.

Such amorphous nanoscale carbon tubes (II) each have a wall with an amorphous structure consisting of a plurality of minute hexagonal carbon layers (graphene sheets) oriented in various directions, and have the advantage of excellent compatibility with resins, presumably because they have active points due to the spacings between the hexagonal carbon layers.

<Iron-Carbon Composites>

The iron-carbon composites (IV) usable in the invention are disclosed in Japanese Unexamined Patent Publication No. 2002-338220 (Japanese Patent No. 3,569,806), and each composed of (a) a carbon tube selected from the group consisting of nanoflake carbon tubes and nested multi-walled carbon nanotubes, and (b) iron carbide or iron, wherein the iron carbide or iron (b) fills 10 to 90% of the internal space of the carbon tube (a). Specifically, the iron-carbon composites have a feature in that the iron carbide or iron does not fill 100% of the internal space of the tube, but fills 10 to 90% of (i.e., partially fills) the space. The wall of the nanoflake carbon tube has a patchwork-like or papier-mache-like form.

In the specification, the term "nanoflake carbon tube" refers to a carbon tube composed of a group of a plurality of (usually many) flake-like graphite sheets formed into a patchwork- or papier-mache-like structure.

Such iron-carbon composites (IV) can be produced according to a method described in Japanese Unexamined Patent Publication No. 2002-338220, the method comprising:

(1) heating an iron halide to 600 to 900° C. in a reaction furnace in which the pressure has been adjusted to $10^{-5}$ Pa to 200 kPa in an inert gas atmosphere and the oxygen concentration in the reaction furnace has been adjusted such that the ratio B/A is between $1\times10^{-10}$ and $1\times10^{-1}$ wherein A is the reaction furnace volume (liters) and B is the amount of oxygen (Ncc), and (2) introducing an inert gas into the reaction furnace, and at a pressure of between $10^{-5}$ Pa and 200 kPa, introducing thereto a pyrolyzable carbon source and performing a heat treatment at 600 to 900° C.

The term "Ncc" herein, which is the unit of the oxygen quantity B, means the volume (cc) of the gas in its normal state at 25° C.

The iron-carbon composites (IV) each comprise (a) a carbon tube selected from the group consisting of nanoflake carbon tubes and nested multi-walled carbon nanotubes and (b) iron carbide or iron. Rather than substantially all the internal space (i.e., the spaces defined by the tube walls) of the carbon tube being filled, a part of the space, more specifically about 10 to 90%, preferably about 30 to 80%, and more preferably about 40 to 70%, of the space is filled with iron carbide or iron.

In the iron-carbon composites (IV) usable in the invention, as described in Japanese Unexamined Patent Publication No. 2002-338220, the carbon portion becomes nanoflake carbon tubes when cooling is carried out at a specific rate after steps (1) and (2), or becomes nested multi-walled carbon nanotubes when a heat treatment in an inert gas atmosphere and cooling at a specific rate are carried out after steps (1) and (2).

<(a-1) Nanoflake Carbon Tubes>

Figure 4:
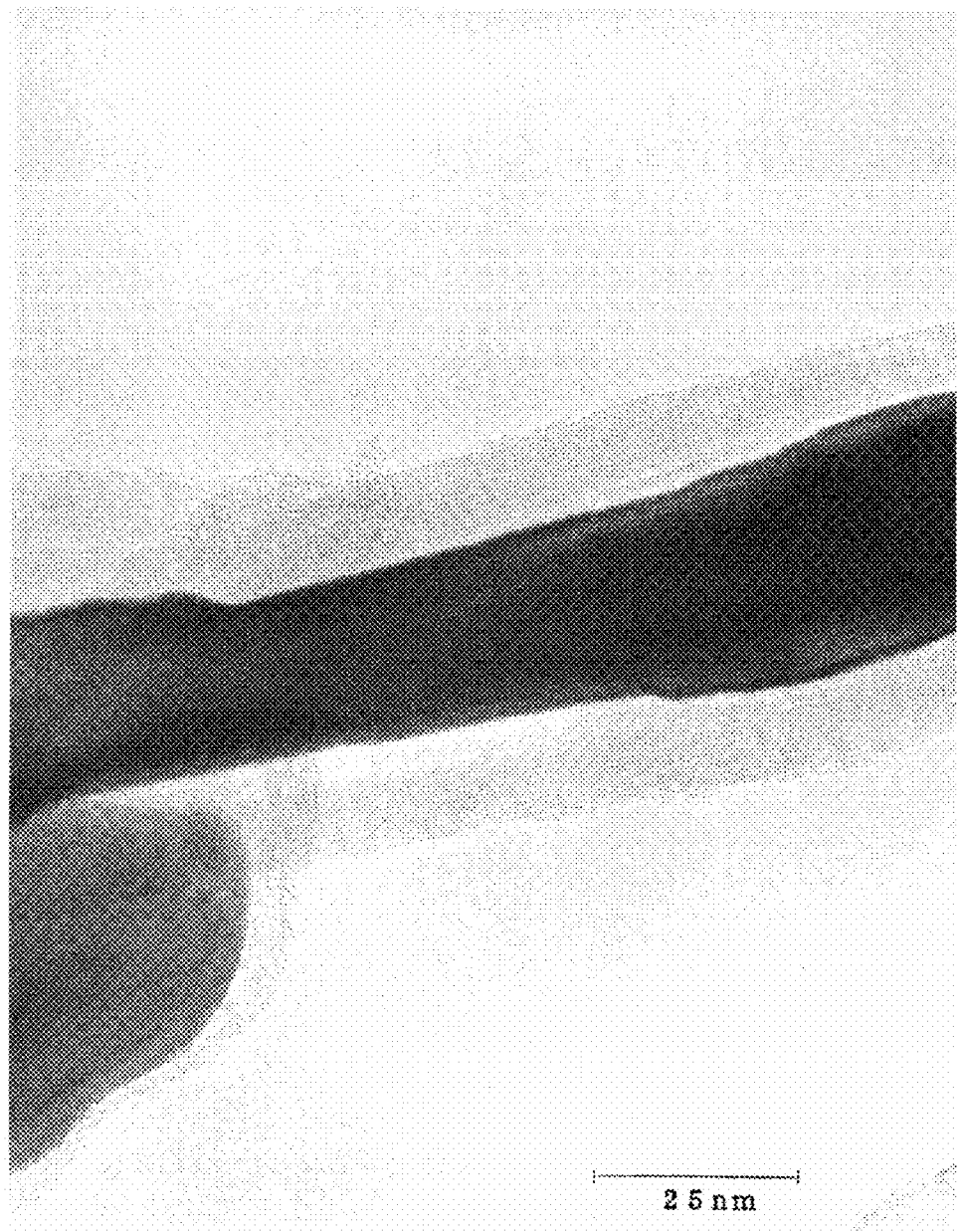
FIG. 4 is a transmission electron microscope (TEM) photograph of a single fiber of the iron-carbon composite forming the carbonaceous material obtained in Example 1 of Japanese Unexamined Patent Publication No. 2002-338220.

The iron-carbon composites (IV) usable in the invention comprising nanoflake carbon tubes (a-1) and iron carbide or iron (b), are typically cylindrical in shape. FIG. 6 shows a transmission electron microscope (TEM) photograph of a cross section substantially perpendicular to the lengthwise direction of such a cylindrical iron-carbon composite (obtained in Example 1 of Japanese Unexamined Patent Publication No. 2002-338220). FIG. 4 shows a TEM photograph of the side thereof.

FIG. 7 (a-1) is a schematic diagram of a TEM image of such a cylindrical nanoflake carbon tube. In FIG. 7 (a-1), 100 schematically shows a TEM image of the lengthwise direction of the nanoflake carbon tube, while 200 schematically shows a TEM image of a cross section substantially perpendicular to the lengthwise direction of the nanoflake carbon tube.

The nanoflake carbon tubes (a-1) constituting the iron-carbon composites (IV) usable in the invention typically have a hollow cylindrical shape. When the cross section of one of the nanoflake carbon tubes is viewed by TEM, it can be seen that arc-shaped graphene sheet images are concentrically grouped and individual graphene sheet images form discontinuous rings; and when the lengthwise direction of the nanoflake carbon tube is viewed by TEM, approximately straight-shaped graphene sheet images are arranged in layers substantially parallel to the lengthwise direction, and the individual graphene sheet images are not continuous over the entire length of the carbon tube, and are instead broken in places.

More specifically, as is clear from FIGS. 6 and 200 in FIG. 7 (a-1), when a cross section perpendicular to the lengthwise direction is observed by TEM, each nanoflake carbon tube (a-1) constituting the iron-carbon composites (IV) usable in the invention has such a structure that numerous arc-shaped graphene sheet images are grouped concentrically (in a multi-walled tubular form), but as indicated by, e.g., 210 and 214, the individual graphene sheet images do not form completely closed, continuous rings, and instead form non-continuous rings that are broken in places. Some of the graphene sheet images may be branched, as indicated by 211. At the non-continuous areas, a plurality of arc-shaped TEM images that make up one non-continuous ring may be such that the layer structure is partially disturbed as indicated by 222 in FIG. 7 (a-1), or there may be gaps between adjacent graphene sheet images as indicated by 223. However, the numerous arc-shaped graphene sheet images observed by TEM, taken together, form a multi-walled tube structure.

As is clear from FIGS. 4 and 100 in FIG. 7 (a-1), when the nanoflake carbon tube (a-1) is viewed in the lengthwise direction by TEM, it can be seen that numerous substantially linear graphene sheet images are arranged in layers substantially parallel to the lengthwise direction of each iron-carbon composite (IV) usable in the invention, but the individual graphene sheet images 110 are not continuous over the entire length of the iron-carbon composite (IV), and are instead broken in places. Some of the graphene sheet images may be branched, as indicated by 111 in FIG. 7 (a-1). Among the TEM images arranged in layers at the non-continuous points, the TEM image of a non-continuous layer may at least partially overlap an adjacent graphene sheet image as indicated by 112 in FIG. 7 (a-1), or it may be slightly apart from an adjacent graphene sheet image as indicated by 113, but the numerous substantially linear TEM images, taken together, form a multi-walled structure.

Such a structure of the nanoflake carbon tubes (a-1) usable in the invention greatly differs from that of conventional multi-walled carbon nanotubes. Specifically, a nested multi-walled carbon nanotube (a-2) has a tube structure (a concentric cylindrical or nested structure) in which, as indicated by 400 in FIG. 4 (a-2), the TEM image of a cross section perpendicular to the lengthwise direction thereof is in a concentric circular form comprising substantially perfectly circular TEM images as indicated by 410, and as indicated by 300 in FIG. 7 (a-2), linear graphene sheet images 310 which are continuous over the entire length in the lengthwise direction are arranged in parallel.

In view of the above, although the details are not yet fully clarified, the nanoflake carbon tubes (a-1) constituting the iron-carbon composites (IV) usable in the invention appear to have such a structure that numerous flaky graphene sheets are stacked in a patchwork- or papier-mache-like structure and, taken together, form a tube.

The iron-carbon composites (IV) usable in the invention, each of which comprises a nanoflake carbon tube (a-1) and iron carbide or iron (b) contained in the internal space of the tube, greatly differ in carbon tube structure from the composites disclosed in Japanese Patent No. 2546114 in which a metal is contained in the internal space of nested multi-walled carbon nanotubes (a-2).

When the nanoflake carbon tubes (a-1) of the iron-carbon composites (IV) usable in the invention are observed by TEM, with respect to the numerous substantially linear graphene sheet images arranged in the lengthwise direction thereof, the length of the individual graphene sheet images is usually about 2 to 500 nm, and particularly about 10 to 100 nm. Specifically, as indicated by 100 in FIG. 7 (a-1), numerous TEM images of the substantially linear graphene sheets indicated by 110 are grouped together to constitute a TEM image of the wall of a nanoflake carbon tube (a-1), and the length of the individual substantially linear graphene sheet images is usually about 2 to 500 nm, and preferably about 10 to 100 nm.

As described above, in the iron-carbon composite (IV), the outermost layer of the wall of each nanoflake carbon tube (a-1) is formed from discontinuous graphene sheets that do not continue over the entire length in the lengthwise direction of the tube, and the outermost hexagonal carbon layer usually has a length of about 2 to 500 nm, and preferably about 10 to 100 nm.

While the carbon portion, i.e., the wall of each nanoflake carbon tube (a-1) in the iron-carbon composites (IV) usable in the invention, is composed of numerous flake-like graphene sheets which are arranged in the lengthwise direction to form a tube as a whole as discussed above, the wall has a graphitic structure in which the mean spacing between the hexagonal carbon layers ($d_{002}$) is 0.34 nm or less, as determined by X-ray diffractometry.

The thickness of the wall of each nanoflake carbon tube (a-1) of the iron-carbon composites (IV) usable in the invention is 49 nm or less, preferably about 0.1 to 20 nm, and more preferably about 1 to 10 nm, and is substantially uniform over the entire length.

<(a-2) Nested Multi-Walled Carbon Nanotubes>

By carrying out Steps (1) and (2) as mentioned above and then performing a specific heating step, the carbon tubes in the obtained iron-carbon composites (IV) become nested multi-walled carbon nanotubes (a-2).

The nested multi-walled carbon nanotubes (a-2) thus obtained have a tube structure (a concentric cylindrical or nested structure) in which, as indicated by 400 in FIG. 7 (*a-2*), the TEM image of a cross section perpendicular to the lengthwise direction thereof is in a concentric circular form comprising substantially perfect circles, and graphene sheet images which are continuous over the entire length in the lengthwise direction are arranged in parallel.

The carbon portion, i.e., the wall of each nested multi-walled carbon tube (a-2) of the iron-carbon composites (IV) usable in the invention, is of a graphitic structure in which the mean spacing between the hexagonal carbon layers ($d_{002}$) is 0.34 nm or less, as determined by X-ray diffractometry.

The thickness of the wall of the nested multi-walled carbon nanotubes (a-2) of the iron-carbon composites (IV) usable in the invention is 49 nm or less, preferably about 0.1 to 20 nm, and more preferably about 1 to 10 nm, and is substantially uniform over the entire length.

<(b) Contained Iron Carbide or Iron>

In the specification, the filling proportion (10 to 90%) of iron carbide or iron (b) in the internal space of a carbon tube selected from the group consisting of the nanoflake carbon tubes (a-1) and nested multi-walled carbon nanotubes (a-2) is determined by transmission electron microscopic observation of the iron-carbon composites (IV) usable in the invention, and is the proportion of the area of an image of the portion filled with iron carbide or iron (b) relative to the area of an image of the internal space of the carbon tube (that is, the space defined by the wall of the carbon tube).

The iron carbide or iron (b) can be contained in the tubes in various ways, such as the carbon tube internal spaces being continuously filled, or the carbon tube internal spaces being intermittently filled, but generally the spaces are intermittently filled. Therefore, the iron-carbon composites (IV) usable in the invention may also be called metal-containing carbon composites, iron-compound-containing carbon composites, or iron carbide- or iron-containing carbon composites.

The iron carbide or iron (b) contained in the iron-carbon composites (IV) usable in the invention is oriented in the lengthwise direction of the carbon tubes, and has high crystallinity, and the proportion of the area of a TEM image of crystalline iron carbide or iron (b) relative to the area of a TEM image of the region filled with iron carbide or iron (b) (hereinafter referred to as the "crystallinity ratio") is generally about 90 to 100%, and preferably about 95 to 100%.

The high crystallinity of the contained iron carbide or iron (b) is clear from the lattice pattern arrangement shown in the TEM image of the contained substance taken from the side of the iron-carbon composites (IV), and is also clear from the distinct diffraction pattern obtained in electron beam diffraction.

The presence of iron carbide or iron (b) as contained in the iron-carbon composites (IV) usable in the invention can be easily confirmed by electron microscopy and EDX (energy dispersive X-ray analyzer).

<Overall Shape of Iron-Carbon Composites>

The iron-carbon composites (IV) usable in the invention have slight curvature, a straight shape and a wall thickness substantially uniform over the entire length, and therefore have a uniform shape over the entire length. The shape is columnar, and mainly cylindrical.

The iron-carbon composites (IV) preferably have a mean outside diameter of about 1 to 100 nm, a mean length of about 0.1 to 1,000 μm, and a mean aspect ratio of about 1 to 1,000, 000; more preferably have a mean outside diameter of about 1 to 100 nm, a mean length of about 0.1 to 1,000 μm, and a mean aspect ratio of about 5 to 10,000; and still more preferably have a mean outside diameter of about 1 to 50 nm, a mean length of about 1 to 400 μm, and a mean aspect ratio of about 10 to 10,000.

The term "straight shape" used to describe the shape of the iron-carbon composites (IV) usable in the invention is defined as a shape characteristic such that the ratio $W/W_o$ is at least 0.8, and particularly at least 0.9, wherein W is the length of the image of a carbonaceous material comprising the iron-carbon composites (IV) usable in the invention observed over an area of 200 to 2000 nm square with a transmission electron microscope, and $W_o$ is the length when said image has been extended linearly.

The iron-carbon composites (IV) usable in the invention have the following properties when considered as a bulk material. Specifically, in the invention, the iron-carbon composites (IV), in each of which iron or iron carbide (b) fills 10 to 90% of the internal space of a carbon tube selected from the group consisting of the nanoflake carbon tubes (a-1) and nested multi-walled carbon nanotubes (a-2), are a bulk material comprising numerous iron-carbon composites (IV) and are obtained in a large quantity in the form of a material that should also be called a carbonaceous material comprising iron-carbon composites (IV), or an iron carbide- or iron-containing carbonaceous material, as opposed to a minute amount, which can be barely observed by microscopic observation.

Figure 5:
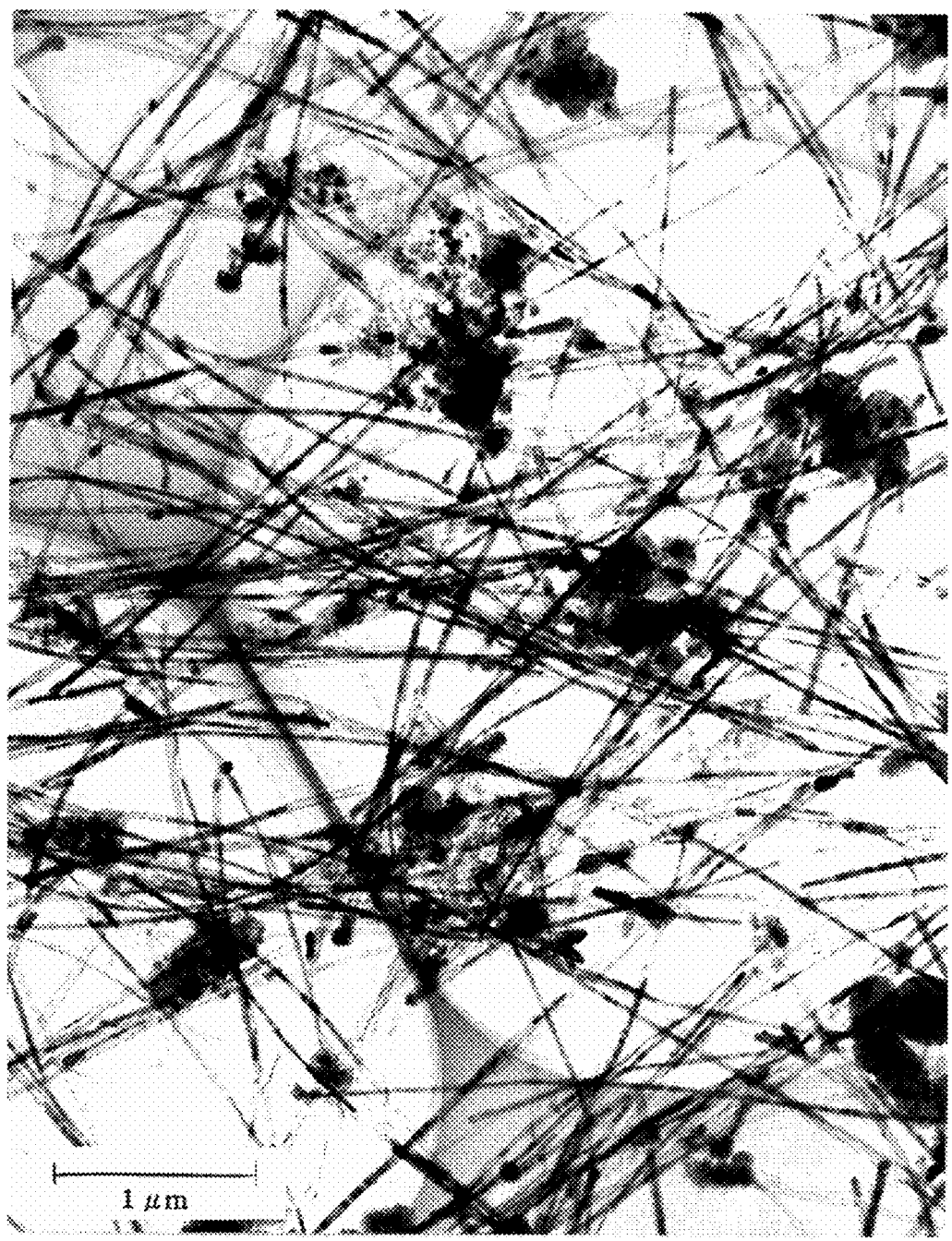
FIG. 5 is a transmission electron microscope (TEM) photograph showing how the iron-carbon composite is present in the carbonaceous material obtained in Example 1 of Japanese Unexamined Patent Publication No. 2002-338220.

FIG. 5 is an electron micrograph of the carbonaceous material usable in the invention, which is obtained in Example 1 of Japanese Unexamined Patent Publication No. 2002-338220, the material comprising nanoflake carbon tubes (a-1) and iron carbide (b) contained in the internal spaces of the tubes.

As seen from FIG. 5, in the carbonaceous material comprising the iron-carbon composites (IV) usable in the invention, iron or iron carbide (b) fills 10 to 90% of the internal space (that is, the space surrounded by the walls of the carbon tubes) of basically almost all (particularly 99% or more) of the carbon tubes, usually there are substantially no carbon tubes whose internal space is empty. In some cases, however, a minute amount of carbon tubes not containing iron carbide or iron (b) may be contained.

Also, with the carbonaceous material for use in the invention, the iron-carbon composites (IV) in which iron or iron carbide (b) fills 10 to 90% of the internal spaces of the carbon tubes are the main component, but there may be cases in which soot or other materials are included besides to the iron-carbon composites (IV) usable in the invention. In such cases, any components other than the iron-carbon composites usable in the invention can be removed so as to increase the purity of the iron-carbon composites (IV) in the carbonaceous material, and to thereby obtain a carbonaceous material consisting essentially of the iron-carbon composites (IV) for use in the invention.

Also, unlike prior art materials that could only be observed in minute amounts by microscopic observation, the carbonaceous material containing iron-carbon composites (IV) for use in the present invention can be synthesized in large quantities, and a weight of 1 mg or more can be easily achieved.

In the powder X-ray diffraction measurement of the carbonaceous material usable in the invention, in which the carbonaceous material is irradiated with a CuKα X-ray over an irradiation area of at least 25 mm² per mg of the carbonaceous material, the ratio R (=Ia/Ib) is preferably about 0.35 to 5, particularly about 0.5 to 4, and more preferably about 1 to 3, wherein Ia is the integrated intensity of the peak having the strongest integrated intensity among the peaks appearing in the range of 40 degrees<2θ<50 degrees assigned to iron or iron carbide (b) contained in the carbon tubes, and Ib is the integrated intensity of the peak appearing in the range of 26 degrees<2θ<27 degrees assigned to the mean spacing between the hexagonal carbon layers ($d_{002}$) of the carbon tubes.

The ratio of Ia/Ib is herein called the R value. Since the peak intensity is viewed as an average value among the carbonaceous material as a whole when the carbonaceous material comprising iron-carbon composites (IV) usable in the invention is observed by X-ray diffraction over an X-ray irradiation area of at least 25 mm², the R value does not represent the content or filling proportion of iron carbide or iron (b) in the single iron-carbon composite (IV) that can be measured by TEM analysis, but represents an average value of the iron carbide or iron (b) content or filling proportion for the carbonaceous material as a whole, which comprises a group of iron-carbon composites (IV).

Furthermore, the average filling proportion for the entire carbonaceous material containing a large number of the iron-carbon composites (IV) usable in the invention can also be determined by observing various fields by TEM, measuring the average iron carbide- or iron (b)-filling proportion in various iron-carbon composites (IV) observed in each field, and calculating the average value of the average filling proportions in said various fields. With this measurement process, the average iron carbide- or iron (b)-filling proportion for the entire carbonaceous material comprising the iron-carbon composites (IV) for use in the invention is about 10 to 90%, and preferably about 40 to 70%.

<Nanoflake Carbon Tubes>

By acid treatment of the iron-carbon composites (IV) in which iron or iron carbide (b) partially fills the internal spaces of nanoflake carbon tubes (a-1), the iron or iron carbide (b) contained therein is dissolved, whereby hollow nanoflake carbon tubes (III), which do not contain iron or iron carbide (b) in their internal spaces, can be obtained.

Acids usable for the acid treatment include hydrochloric acid, sulfuric acid, nitric acid, and hydrofluoric acid. The concentration of such an acid is preferably about 0.1 to 2N. The acid treatment can be carried out in various ways. For example, 1 g of iron-containing nanoflake carbon tubes is dispersed in 100 ml of 1N hydrochloric acid, and the dispersion is stirred at room temperature for 6 hours and filtered, followed by two cycles of the same steps using 100 ml of 1N hydrochloric acid, to thereby obtain hollow nanoflake carbon tubes (III).

Such an acid treatment does not substantially change the basic structure of the nanoflake carbon tubes (III). Therefore, in the hollow nanoflake carbon tubes (III) containing no iron or iron carbide (b) in the internal spaces thereof, the outermost hexagonal carbon layer has a length of not more than 500 nm, preferably 2 to 500 nm, and more preferably 10 to 100 nm.

Nanoscale Carbon Covered with Titanium Oxide

Regarding the thus-obtained nanoscale carbon covered with titanium oxide, 70 to 100%, and more preferably 85 to 100% of the surface of the rod-like or fibrous nanoscale carbon is covered with the titanium oxide in order to prevent the occurrence of leakage current. The element ratio (C/Ti) of carbon and titanium on the surface of the rod-like or fibrous nanoscale carbon covered with titanium oxide is preferably 0/100 to 70/30 (atomic ratio), and more preferably 0/100 to 50/50 (atomic ratio). The proportion of the surface covering (i.e., the proportion of the area on the carbon surface covered with the covering layer comprising titanium oxide particles connected to one another) can be measured by, e.g., electron microscopic (SEM or TEM) observation. The element ratio (C/Ti) of carbon and titanium on the surface of the rod-like or fibrous anoscale carbon covered with titanium oxide can be measured by, e.g., X-ray photoelectron spectroscopic analysis.

2-2. Step (B)

In Step (B), the nanoscale carbon present in the nanoscale carbon covered with titanium oxide obtained in Step (A) is removed, thereby preparing a titanium oxide structure (1). This turns the titanium oxide into an anatase crystal structure, and provides the advantage of increasing adhesion. There are no limitations on the method for performing Step (B) as long as the nanoscale carbon can be removed; however the nanoscale carbon can be removed simply by oxidation. For example, when the nanoscale carbon is removed by oxidation by heating in air, the heating temperature is preferably 450° C. or more, more preferably 550° C. or more, still more preferably 600 to 750° C., and even more preferably 600 to 700° C.

3. Porous Titanium Oxide Composition

The porous titanium oxide composition of the invention comprises a mixture of:

(1) a rod-like, tubular, or fibrous titanium oxide structure comprising titanium oxide particles (1a) connected to one another; and (2) titanium oxide particles.

3-1. Titanium Oxide Structure (1)

The titanium oxide structure (1) is the same as described in Section 1 above, and is a rod-like, tubular, or fibrous structure comprising titanium oxide particles (1a) that are connected to one another.

3-2. Titanium Oxide Particles (2)

Titanium oxide particles that are the same or different from the titanium oxide particles (1a) used in the preparation of the titanium oxide structure (1) may be used as the titanium oxide particles (2). Specific examples of usable titanium oxide particles are as follows.

There are no limitations on the crystal structure of the titanium oxide particles (2); however, the titanium oxide particles (2) preferably comprise at least one member selected from the group consisting of anatase titanium oxide, rutile titanium oxide, and brookite titanium oxide. The titanium oxide particles (2) comprising anatase titanium oxide are preferable because of their high photoactivity. The crystal structure of the titanium oxide particles (2) can be measured by, e.g., X-ray diffraction or Raman spectroscopic analysis.

The mean particle size of the titanium oxide particles (2) is preferably 1 to 500 nm, and more preferably 5 to 100 nm, in order to adsorb a greater amount of dye and absorb a greater amount of light. However, the titanium oxide particles (2) may also incorporate titanium oxide particles having a greater particle size and, thus, greater light scattering in order to achieve a light-confinement effect inside a cell. The mean particle size can be measured by, e.g., electron microscopic (SEM or TEM) observation.

3-3. Porous Titanium Oxide Composition

The porous titanium oxide composition of the invention comprises a mixture of the titanium oxide structure (1) and titanium oxide particles (2) described above.

In the invention, the titanium oxide structure (1) is not used alone, but used in admixture with the titanium oxide particles (2), thereby increasing fine irregularities on the surface, as shown in FIG. 8, allowing a dye to be easily deposited on the surface.

To ensure fluidity during dispersion, the porous titanium oxide composition of the invention preferably comprises 0.1 to 90 wt %, preferably 0.2 to 80 wt %, and more preferably 0.5 to 60 wt %, of the titanium oxide structure (1); and 10 to 99.9 wt %, preferably 20 to 99.8 wt %, and more preferably 40 to 99.5 wt %, of the titanium oxide particles (2). The use of the titanium oxide structure (1) in a proportion of 60 wt % or less also results in great ease of application of the composition and a high covering-film strength. This provides the advantage of achieving substantially uniform, stable conductivity and photoelectric conversion efficiency. This also provides the advantage of achieving higher photoelectric conversion efficiency at lower costs.

The porous titanium oxide composition of the invention preferably comprises 40 to 100%, and preferably 60 to 100%, of pores having a pore size of 5 to 50 nm of the total volume of pores, in order to provide a large surface area and maintain the ion-diffusion properties of the electrolytic solution.

Furthermore, the porous titanium oxide composition of the invention preferably has a specific surface area of 30 to 500 $m^2/g$, more preferably 50 to 500 $m^2/g$, and still more preferably 60 to 500 $m^2/g$, in order to provide a large surface area, allow a large amount of dye to be deposited thereon, and efficiently absorb incident light. However, the porous titanium oxide composition may also incorporate titanium oxide particles having greater light scattering, and, thus, a smaller specific surface area, in order to achieve a light-confinement effect inside a cell.

4. Process (1) for Producing Porous Titanium Oxide Composition

The porous titanium oxide composition of the invention is obtained by a process comprising, for example:

(A1) forming a covering layer comprising titanium oxide particles (1a) connected to one another on a surface of rod-like or fibrous nanoscale carbon by performing a precipitation reaction from a fluorotitanate complex, thereby preparing nanoscale carbon covered with titanium oxide;

(B1) removing the nanoscale carbon present in the nanoscale carbon covered with titanium oxide obtained in Step (A1), thereby preparing a titanium oxide structure (1); and (C1) mixing the titanium oxide structure (1) obtained in Step (B1) with titanium oxide particles (2).

4-1. Step (A1)

Step (A1) in the process (1) for producing the porous titanium oxide composition is the same as Step (A) in the process for producing the titanium oxide structure (1). That is, the nanoscale carbon, fluorotitanate complex, and titanium oxide particles (1a), as well as the conditions and the like used in Step (A1), are the same as those in Step (A).

4-2. Step (B1)

Step (B1) in the process (1) for producing the porous titanium oxide composition is the same as Step (B) in the process for producing the titanium oxide structure (1). That is, the method for removing the nanoscale carbon, the heating temperature during the removal by oxidation, and the like are the same as those in Step (B).

4-3. Step (C1)

In Step (C1), the titanium oxide structure (1) obtained in Step (B1) is mixed with titanium oxide particles (2).

Examples of mixing methods include, but are not limited to, known mixing methods using a paint shaker and a mortar, as well as various known mixing methods using, e.g., a ball mill, a sand mill, a jet mill, a kneader, and a roller. The titanium oxide structure (1) and titanium oxide particles (2) may be diluted with a low-viscosity solvent, and then mixed using, e.g., a paint shaker, after which the solvent is removed by distillation under reduced pressure.

5. Process (2) for Producing Porous Titanium Oxide Composition

The porous titanium oxide composition of the invention can be obtained not only by the process (1) described above, but also by a process comprising the steps of:

(A2) forming a covering layer comprising titanium oxide particles (1a) connected to one another on a surface of a rod-like or fibrous nanoscale carbon by performing a precipitation reaction from a fluorotitanate complex, thereby preparing nanoscale carbon covered with titanium oxide;

(B2) mixing the nanoscale carbon covered with titanium oxide obtained in Step (A2) with titanium oxide particles (2); and (C2) removing the nanoscale carbon present in the nanoscale carbon covered with titanium oxide in the mixture obtained in Step (B2).

The process (2) for producing the porous titanium oxide composition differs from the process (1) for producing the porous titanium oxide composition, in that the order of Steps (B1) and (C1) is reversed.

5-1. Step (A2)

Step (A2) in the process (2) for producing the porous titanium oxide composition is the same as Step (A) in the process for producing the titanium oxide structure (1), and Step (A1) in the process (1) for producing the porous titanium oxide composition. That is, the nanoscale carbon, fluorotitanate complex, and titanium oxide particles (1a), as well as the conditions and the like used in Step (A2), are the same as those in Step (A) and Step (A1).

5-2. Step (B-2)

Step (B-2) in the process (2) for producing the porous titanium oxide composition corresponds to Step (C1) in the process (1) for producing the porous titanium oxide composition. That is, the titanium oxide particles (2), mixing method, and the like used in Step (B2) are the same as those in Step (C1).

5-3. Step (C2)

Step (C2) in the process (2) for producing the porous titanium oxide composition corresponds to Step (B) in the process for producing the titanium oxide structure (1), and Step (B1) in the process (1) for producing the porous titanium oxide composition. That is, the temperature conditions and the like used in Step (C2) are the same as those in Step (B1).

6. Photoelectric Conversion Element

The photoelectric conversion element of the invention includes at least a conductive substrate, a semiconductor layer, a charge transport layer, and an opposite electrode.

The conductive substrate typically has an electrode layer on the substrate. The material, thickness, dimensions, shape, and the like of the substrate can be suitably selected according to the purpose. Examples of usable substrates include, but are not limited to, metals, colorless or colored glass, wired sheet glass, glass blocks, and colorless or colored resins. Examples of such resins include polyesters, such as polyethylene terephthalate, polyamides, polysulfones, polyethersulfones, polyether ether ketones, polyphenylene sulfides, polycarbonates, polyimides, polymethyl methacrylates, polystyrenes, cellulose triacetate, and polymethylpentene. The substrate used in the invention has smooth surfaces at room temperature. The surfaces may be flat or curved, or may deform under stress.

Examples of materials of the conductive film that functions as an electrode include, but are not limited to, metals such as gold, silver, chromium, copper, tungsten, and titanium; metal thin films; and metal oxides. Examples of metal oxides that can be suitably used include metal oxides of tin, zinc, and the like that are doped with trace amounts of other metal elements, such as indium tin oxide (ITO; $In_2O_3$:Sn), fluorine-doped tin oxide (FTO; $SnO_2$:F), aluminum-doped zinc oxide (AZO; ZnO:Al), and antimony-doped tin oxide (ATO; $SnO_2$:Sb).

The film thickness of the conductive film is typically 100 to 10,000 nm, and preferably 500 to 3,000 nm. The surface resistance (resistivity) of the conductive film may be suitably selected, but is typically 0.5 to 500 Ω/sq, and preferably 1 to 50 Ω/sq.

There are no limitations on the method for forming a conductive film; any known method can be suitably employed according to the type of metal or metal oxide used. Typically, methods such as vacuum deposition, ion-plating, CVD, and sputtering can be used. In any case, a conductive film is preferably formed at a substrate temperature of 20 to 700° C.

The opposite electrode (counter electrode) for use in the photoelectric conversion element of the invention may have a monolayer structure made of a conductive material, or may include a conductive layer and a substrate. The material, thickness, dimensions, shape, and the like of the substrate can be suitably selected according to the purpose. Examples of usable conductive substrates include, but are not limited to, metals, colorless or colored glass, wired sheet glass, glass blocks, and resins. Examples of such resins include polyesters, such as polyethylene terephthalate, polyamides, polysulfones, polyethersulfones, polyether ether ketones, polyphenylene sulfides, polycarbonates, polyimides, polymethyl methacrylates, polystyrenes, cellulose triacetate, and polymethylpentene. Alternatively, a conductive material may be directly applied, plated, or deposited (by PVD or CVD) on the charge transport layer, and an opposite electrode may be formed thereon.

Conductive materials used herein include materials with low specific resistance, e.g., metals such as platinum, gold, nickel, titanium, aluminum, copper, silver, and tungsten, carbon materials, and conductive organic materials.

A metal lead may also be used to reduce the resistance of the counter electrode. The metal lead is preferably made of platinum, gold, nickel, titanium, aluminum, copper, silver, tungsten, or the like, and particularly preferably made of aluminum or silver.

A semiconductor layer made of the titanium oxide structure or porous titanium oxide composition of the invention is used as the semiconductor layer. There are no limitations on the orientation of the titanium oxide structure of the invention; the titanium oxide structure need not be oriented in a particular direction, e.g., it need not be oriented such that the lengthwise direction thereof is substantially perpendicular to the substrate.

A semiconductor layer may be formed on the conductive substrate by, e.g., a method wherein a paste containing the titanium oxide structure or porous titanium oxide composition of the invention is prepared, and the paste is applied to the conductive substrate and fired. Solvents usable for the paste include water and organic solvents.

Any organic solvents can be used, as long as they can disperse the titanium oxide structure or porous titanium oxide composition of the invention. Examples of usable organic solvents include alcohols such as ethanol, methanol, and terpineol; and glycols such as ethylene glycol, polyethylene glycol, propylene glycol, and polypropylene glycol. These solvents are typically used in combination, in consideration of their dispersibilities, volatilities, and viscosities. The proportion of the solvents in the paste is preferably 50 to 90 wt %, and more preferably 70 to 85 wt %, in order to provide fluidity during application, maintain the thickness upon application, and form porous titanium oxide.

In addition to the above-mentioned solvents, the dispersion may further contain a thickener and other components.

Examples of thickeners include alkyl celluloses, such as methylcellulose and ethylcellulose. Among these, an alkyl cellulose, and particularly ethylcellulose, can be suitably used.

The proportion of the thickener in the paste is preferably 2 to 20 wt %, and more preferably 3 to 15 wt %, in order to provide a good balance between fluidity during application and thickness upon application.

The proportion of solids in the paste is preferably 10 to 50 wt %, and more preferably 15 to 30 wt %, in order to provide a good balance between fluidity during application and thickness upon application, as noted above. Further, the proportion of the titanium oxide structure (1) in the solids is preferably 0.1 to 90 wt %, more preferably 0.2 to 80 wt %, and still more preferably 0.5 to 60 wt %.

The photoelectric conversion element of the invention comprises a dye deposited (e.g., adsorbed or contained) on the semiconductor layer, in order to, for example, improve the light absorption efficiency of the semiconductor layer.

There are no limitations on dyes as long as they have absorption properties in the visible and near-infrared regions, and can improve (sensitize) the light absorption efficiency of the semiconductor layer. Preferable dyes include metal complex dyes, organic dyes, natural dyes, and semiconductors. Further, dyes having in their molecules functional groups, such as carboxy, hydroxy, sulfonyl, phosphonyl, carboxy-alkyl, hydroxyalkyl, sulfonylalkyl, and phosphonylalkyl groups, are suitably used in order to provide adsorbability to the semiconductor layer.

Examples of usable metal complex dyes include ruthenium, osmium, iron, cobalt, zinc, and mercury complexes; metal phthalocyanines; and chlorophylls. Examples of organic dyes include, but are not limited to, cyanine dyes, hemicyanine dyes, merocyanine dyes, xanthene dyes, triphenylmethane dyes, and metal-free phthalocyanine dyes. Preferable semiconductors that can be used as dyes are i-type amorphous semiconductors having high optical absorption coefficients, direct band-gap semiconductors, and semiconductor particles that exhibit quantum size effects and efficiently absorb visible light. Typically, these various semiconductors, metal complex dyes, and organic dyes can be used singly, or can be used in a combination of two types or more, to broaden the wavelength region of photoelectric conversion as much as possible, and to increase the conversion efficiency. The dyes to be mixed and their proportions can be selected to match the desired wavelength region and intensity distribution of the light source.

A dye can be adsorbed on the semiconductor layer by, e.g., a method wherein a solution obtained by dissolving the dye in a solvent is applied to the semiconductor layer by, e.g., spray coating or spin coating, and the solution is subsequently dried. In this case, the substrate may be heated to an appropriate temperature. A method wherein the dye is adsorbed by immersing the semiconductor layer in the solution can also be used. The immersion time is not limited as long as the dye is sufficiently adsorbed, but it is preferably 10 min to 30 hr, and more preferably 1 to 20 hr. If necessary, the solvent and the substrate may be heated during the immersion. The concentration of the dye when prepared into a solution is 1 to 1,000 mmol/L, and preferably about 10 to 500 mmol/L.

There are no limitations on the solvent used, but water and organic solvents are preferably used. Examples of organic solvents include alcohols such as methanol, ethanol, 1-propanol, 2-propanol, 1-butanol, 2-butanol, and t-butanol; nitriles such as acetonitrile, propionitrile, methoxypropionitrile, and glutaronitrile; aromatic hydrocarbons such as benzene, toluene, o-xylene, m-xylene, and p-xylene; aliphatic hydrocarbons such as pentane, hexane, and heptane; alicyclic hydrocarbons such as cyclohexane; ketones such as acetone, methyl ethyl ketone, diethyl ketone, and 2-butanone; ethers such as diethylether and tetrahydrofuran; ethylene carbonate; propylene carbonate; nitromethane; dimethyl formamide; dimethyl sulfoxide; hexamethylphosphoramide; dimethoxyethane; γ-butyrolactone; γ-valerolactone; sulfolane; dimethoxyethane; adiponitrile; methoxyacetonitrile; dimethylacetamide; methylpyrrolidinone; dimethylsulfoxide; dioxolane; sulfolane; trimethyl phosphate; triethyl phosphate; tripropyl phosphate; ethyl dimethyl phosphate; tributyl phosphate; tripentyl phosphate; trihexyl phosphate; triheptyl phosphate; trioctyl phosphate; trinonyl phosphate; tridecyl phosphate; tris(trifluoromethyl)phosphate; tris(pentafluoroethyl)phosphate; triphenyl polyethylene glycol phosphate; and polyethylene glycol.

In order to reduce aggregation or like interactions between dye particles, a colorless compound having surfactant properties may be added to the solution containing the adsorbed dye, and the compound may be co-adsorbed on the semiconductor layer. Examples of such colorless compounds include sulfonates and steroid compounds having carboxy or sulfo groups, such as cholic acid, deoxycholic acid, chenodeoxycholic acid, and taurodeoxycholic acid.

After the adsorption step, unadsorbed dye is preferably rapidly removed by washing. Washing is preferably performed in a wet washing tank using acetonitrile, an alcohol solvent, or the like.

After the adsorption of the dye, the surface of the semiconductor layer may be treated with, e.g., an amine, a quarternary ammonium salt, an ureido compound having at least one ureido group, a silyl compound having at least one silyl group, an alkali metal salt, or an alkaline earth metal salt. Examples of preferable amines include pyridine, 4-t-butylpyridine, and polyvinyl pyridine. Examples of preferable quarternary ammonium salts include tetrabutylammonium iodide and tetrahexylammonium iodide. These compounds may be dissolved in organic solvents, or may be used as is if they are liquids.

The charge transport layer contains a charge transport material that functions to supplement the oxidized dye with electrons. The charge transport material used herein is a charge transport material utilizing ions. Examples of such charge transport materials include solutions in which redox-pair ions are dissolved; gel electrolyte compositions in which polymer-matrix gels are impregnated with the solutions of redox pairs; and solid electrolyte compositions.

The electrolytic solution used as a charge transport material utilizing ions preferably includes an electrolyte, a solvent, and additives. Examples of electrolytes used in the electrolytic solution include combinations of iodine and iodides (metal iodides, such as LiI, NaI, KI, CsI, and $CaI_2$; and salts of quaternary ammonium compounds and iodine, such as tetraalkyl ammonium iodide, pyridinium iodide, and imidazolium iodide); combinations of bromine and bromides (metal bromides, such as LiBr, NaBr, KBr, CsBr, CaBr, and $CaBr_2$; and salts of quaternary ammonium compounds and bromine, such as tetraalkylammonium bromide and pyridinium bromide); metal complexes such as ferrocyanate-ferricyanate and ferrocene-ferricinium ions; sulfur compounds such as polysodium sulfide and alkylthiol-alkyl disulfide; viologen dyes; and hydroquinone-quinone. Preferable among these are electrolytes made of combinations of $I_2$ and LiI or salts of quaternary ammonium compounds and iodine, such as pyridinium iodide and imidazolium iodide. These electrolytes may also be used in combination.

Any solvents that are generally used in electrochemical cells and batteries can be used as the solvent. Specific examples of usable solvents include acetic anhydride, methanol, ethanol, tetrahydrofuran, propylene carbonate, nitromethane, acetonitrile, dimethylformamide, dimethyl sulfoxide, hexamethylphosphoramide, ethylene carbonate, dimethoxyethane, γ-butyrolactone, γ-valerolactone, sulfolane, dimethoxyethane, propionitrile, glutaronitrile, adiponitrile, methoxyacetonitrile, dimethylacetamide, methylpyrrolidinone, dimethyl sulfoxide, dioxolane, sulfolane, trimethyl phosphate, triethyl phosphate, tripropyl phosphate, ethyl dimethyl phosphate, tributyl phosphate, tripentyl phosphate, trihexyl phosphate, triheptyl phosphate, trioctyl phosphate, trinonyl phosphate, tridecyl phosphate, tris(trifluoromethyl)phosphate, tris(pentafluoroethyl)phosphate, triphenyl polyethylene glycol phosphate, and polyethylene glycol. Particularly preferable are propylene carbonate, ethylene carbonate, dimethyl sulfoxide, dimethoxyethane, acetonitrile, γ-butyrolactone, sulfolane, dioxolane, dimethylformamide, dimethoxyethane, tetrahydrofuran, adiponitrile, methoxyacetonitrile, methoxypropionitrile, dimethylacetamide, methylpyrrolidinone, dimethyl sulfoxide, dioxolane, sulfolane, trimethyl phosphate, triethyl phosphate, and the like. Room-temperature molten salts are also usable. The term "room-temperature molten salts" herein means salts made of ion pairs that are molten (namely, liquid) at room temperature; these salts generally have melting points of 20° C. or less, and are liquid at temperatures over 20° C. The above-mentioned solvents may be used alone or in a combination of two types or more.

Moreover, a basic compound such as 4-t-butylpyridine, 2-picoline, or 2,6-lutidine is preferably added to the molten salt electrolyte composition or electrolytic solution mentioned above. The concentration of a basic compound when it is added to the electrolytic solution is preferably in the range of 0.05 to 2 mol/L. When a basic compound is added to the molten salt electrolyte composition, the basic compound preferably has an ionic group. The proportion of the basic compound in the entire molten salt electrolyte composition is preferably 1 to 40 mass %, and more preferably 5 to 30 mass %.

There are no limitations on materials usable as polymer matrices, as long as they can form solids or gels alone, or when plasticizers, support electrolytes, or plasticizers and support electrolytes are added thereto. Polymer compounds generally used as polymer matrices can be used.

Examples of such polymer compounds having properties as polymer matrices include polymer compounds obtained by polymerization or copolymerization of monomers, such as hexafluoropropylene, tetrafluoroethylene, trifluoroethylene, ethylene, propylene, acrylonitrile, vinylidene chloride, acrylic acid, methacrylic acid, maleic acid, maleic anhydride, methyl acrylate, ethyl acrylate, methyl methacrylate, styrene, and vinylidene fluoride. These polymer compounds may be used alone or as mixtures. Among the above, a polyvinylidene fluoride-based polymer compound is preferable.

The charge transport layer can be formed according to either of the following two methods: A first method includes inserting a liquid charge transport layer into a gap formed between a semiconductor layer and a counter electrode that have previously been laminated. A second method includes forming a charge transport layer directly on a semiconductor layer, followed by the formation of a counter electrode.

In the former method, the charge transport layer can be inserted using an atmospheric pressure process that utilizes capillary action during, e.g., immersion, or using a vacuum process wherein the gaseous phase in the gap is replaced with the liquid phase by setting the pressure lower than the atmospheric pressure.

When a wet charge transport layer is used in the latter method, a counter electrode is typically formed in an undried state, and a means for preventing liquid leakage is provided for the edge portions. Furthermore, when a gel electrolyte composition is used, it may be applied wet and subsequently, solidified by polymerization or a like method. The solidification may be performed prior to or subsequent to the formation of a counter electrode.

EXAMPLES

The present invention will be described in detail with reference to examples; however, the invention is not limited to these examples.

Comparative Example 1

A powder obtained by firing titanium oxide particles with a particle size of 20 nm for 1 hour at 650° C. was processed into a 0.3 mm thick tabular shape at a pressure of 10 MPa, and a voltage of 1 V was applied across the pellets. The value of the current flow was 0.065 µA. Thus, the powder resistance was found to be $3.8 \times 10^6$ Ω·m.

Example 1

150 g of 69% nitric acid was added to 0.96 g of nanoscale carbon tubes (mean diameter: 35 nm, mean length: 5 µm, mean aspect ratio: 143), and the mixture was maintained for 6 hours at 90 to 95° C. The resulting material was filtered, washed with distilled water until the filtrate showed a pH of 6 to 7, and dried.

The dried product was dispersed in 100 g of distilled water containing 3.7 g of a polyether dispersant, using an ultrasonic homogenizer. To the nanoscale carbon dispersion was added ammonium hexafluorotitanate diluted to 1.0 M and boric acid diluted to 1.0 M in concentrations of 0.20 M and 0.4 M, respectively. The mixture was allowed to stand for 16 hours at 35° C. and subsequently filtered and dried to give a structure wherein the surface of the nanoscale carbon tubes was covered with titanium oxide (nanoscale carbon tubes covered with titanium oxide).

Measurement of this structure by X-ray photoelectron spectroscopic analysis showed that the carbon/titanium atomic ratio was 0.1, with only a slight amount of carbon detected. Further, electron microscopic (SEM) observation showed that the proportion of titanium surface covering was about 98%. The proportion of the surface covering was measured, assuming that any smooth portion free of irregularities with a size of 1 nm or more (a portion of the carbon tubes not covered with titanium oxide) continuously present in a length of 5 nm or more was an uncovered portion where carbon tubes were exposed.

As opposed to X-ray diffractometry and Raman spectroscopic analysis, which reflect information of depths up to several micrometers, X-ray photoelectron spectroscopic analysis provides an analysis of a surface portion of several nanometers. Therefore, it was observed that the nanoscale carbon tubes were covered with the titanium oxide, without being exposed.

The nanoscale carbon tubes covered with titanium oxide were fired in air for 1 hour at 600° C. to remove the nanoscale carbon tubes, thereby giving a tubular titanium oxide structure wherein titanium oxide particles were connected to one another.

The crystal phase of the fired structure was identified to be mainly anatase by X-ray diffractometry and Raman spectroscopic analysis.

No graphite peaks derived from the nanoscale carbon tubes were observed.

FIGS. 1, 9, and 10 show the results of electron microscopic (SEM and TEM) observation of the structure. 5-20 nm titanium oxide particles were grouped in the form of tubes with a thickness of about 30 to 50 nm, a mean diameter of 80 to 150 nm, a mean length of about 1,000 to 10,000 nm, and a mean aspect ratio of about 10 to 100.

Electron diffraction measurements were conducted at Points A to C (an end portion of the titanium oxide structure) in FIG. 9 and Points D to F (a central portion of the titanium oxide structure) in FIG. 10. The measurements confirmed the structure as shown in Table 1 below.

TABLE 1

| Measurement Point | End Portion | | Central Portion | |
|---|---|---|---|---|
| | Sign | Crystal Structure | Sign | Crystal Structure |
| Outer Side of Tubular Structure | A | Anatase | D | Brookite |
| Interior of Tubular Structure | B | Brookite | E | Magneli Phase ($Ti_4O_7$) |
| Inner Side of Tubular Structure | C | Magneli Phase ($Ti_4O_7$) | F | Anatase |

Measurement of the specific surface area by the BET method showed that the titanium oxide structure had a specific surface area as large as 95 m²/g.

Experimental Example 1

The structure prepared in Example 1 was processed into a 0.3 mm thick tabular shape at a pressure of 10 MPa, and a voltage of 1 V was applied across the pellets. A current flow of 0.1 μA was observed. This confirmed that the structure of Example 1 exhibited a conductivity higher than that of the structure of Comparative Example 1 using titanium oxide particles, which was evaluated by the same method. This shows that the powder resistance was $1.9 \times 10^6$ Ω·m.

Example 2

150 g of 69% nitric acid was added to 0.48 g of nanoscale carbon tubes (mean diameter: 10 nm, mean length: 10 μm, mean aspect ratio: 1,000), and the mixture was maintained for 3 hours at 90 to 95° C. The resulting material was filtered, washed with distilled water until the filtrate showed a pH of 6 to 7, and dried.

The dried product was dispersed in 100 g of distilled water containing 3.7 g of a polyether dispersant using an ultrasonic homogenizer. To the nanoscale carbon dispersion was added ammonium hexafluorotitanate diluted to 1.0 M and boric acid diluted to 1.0 M in concentrations of 0.1 M and 0.2 M, respectively. The mixture was allowed to stand for 20 hours at 35° C. and subsequently filtered and dried to give a structure wherein the surface of the nanoscale carbon tubes was covered with titanium oxide (nanoscale carbon tubes covered with titanium oxide).

Measurement of this structure by X-ray photoelectron spectroscopic analysis showed that the carbon/titanium atomic ratio was 0.1, with only a slight amount of carbon detected. Further, electron microscopic (SEM) observation showed that the proportion of titanium surface covering was about 89%.

The nanoscale carbon tubes covered with titanium oxide were fired in air for 1 hour at 600° C. to remove the nanoscale carbon tubes, thereby giving a tubular titanium oxide structure wherein titanium oxide particles were connected to one another.

The crystal phase of the fired structure was identified to be mainly anatase by X-ray diffractometry and Raman spectroscopic analysis.

No graphite peaks derived from the nanoscale carbon tubes were observed.

Further, electron microscopic (SEM and TEM) observation showed that 2-15 nm titanium oxide particles were grouped in the form of tubes with a thickness of about 10 to 30 nm, a mean diameter of 30 to 70 nm, a mean length of about 3,000 to 10,000 nm, and a mean aspect ratio of about 50 to 300.

Measurement of the specific surface area by the BET method showed that the titanium oxide structure had a specific surface area as large as 150 m²/g.

Experimental Example 2

The structure prepared in Example 2 was processed into a 0.3 mm thick tabular shape at a pressure of 10 MPa, and a voltage of 1 V was applied across the pellets. The average powder resistance was $1.50 \times 10^6$ Ω·m.

Example 3

150 g of 69% nitric acid was added to 0.96 g of nanoscale carbon tubes (mean diameter: 100 nm, mean length: 10 μm, mean aspect ratio: 100), and the mixture was maintained for 6 hours at 90 to 95° C. The resulting material was filtered, washed with distilled water until the filtrate showed a pH of 6 to 7, and dried.

The dried product was dispersed in 100 g of distilled water containing 3.7 g of a polyether dispersant using an ultrasonic homogenizer. To the nanoscale carbon dispersion was added ammonium hexafluorotitanate diluted to 1.0 M and boric acid diluted to 1.0 M in concentrations of 0.2 M and 0.4 M, respectively. The mixture was allowed to stand for 24 hours at 35° C. and subsequently filtered and dried to give a structure wherein the surface of the nanoscale carbon tubes was covered with titanium oxide (nanoscale carbon tubes covered with titanium oxide).

Electron microscopic (SEM) observation showed that the titanium oxide surface covering was substantially free of defects.

The nanoscale carbon tubes covered with titanium oxide were fired in air for 2 hours at 700° C. to remove the nanoscale carbon tubes, thereby giving a tubular titanium oxide structure wherein titanium oxide particles were connected to one another.

The crystal phase of the fired structure was identified to be mainly anatase by X-ray diffractometry and Raman spectroscopic analysis.

No graphite peaks derived from the nanoscale carbon tubes were observed.

Further, electron microscopic (SEM and TEM) observation showed that 10-20 nm titanium oxide particles were grouped in the form of tubes with a thickness of about 30 to 80 nm, a mean diameter of 160 to 260 nm, a mean length of about 1,000 to 5,000 nm, and a mean aspect ratio of about 4 to 30.

Measurement of the specific surface area by the BET method showed that the titanium oxide structure had a specific surface area of 50 m²/g.

Experimental Example 3

The structure prepared in Example 3 was processed into a 0.3 mm thick tabular shape at a pressure of 10 MPa, and a voltage of 1 V was applied across the pellets. The average powder resistance was $1.10 \times 10^6$ Ω·m.

Example 4

A titanium oxide structure was obtained by the same steps as in Example 1, except that the firing temperature was changed to 750° C.

Experimental Example 4

As in Example 1, the structure prepared in Example 4 was processed into a 0.3 mm thick tabular shape at a pressure of 10 MPa, and a voltage of 1 V was applied across the pellets. A current flow of 0.242 μA was observed. This confirmed that the structure of Example 4 exhibited a conductivity higher than that of the structure of Comparative Example 1 using titanium oxide particles, which was evaluated by the same method. This shows that the powder resistance was $1.08 \times 10^6$ Ω·m.

Example 5

A titanium oxide structure was obtained by the same steps as in Example 4 (the firing temperature was 750° C.), except that the firing atmosphere was changed to nitrogen.

Experimental Example 5

As in Example 4, the structure prepared in Example 5 was processed into a 0.3 mm thick tabular shape at a pressure of 10 MPa, and a voltage of 1 V was applied across the pellets. A current flow of 52.3 μA was observed. This confirmed that the structure of Example 5 exhibited a conductivity higher than that of the structure of Comparative Example 1 using titanium oxide particles, which was evaluated by the same method. This shows that the powder resistance was $4.96 \times 10^4$ Ω·m.

Examples 6 to 11 and Comparative Example 2

The titanium oxide structure produced according to Example 1 was mixed with titanium oxide particles (crystal structure: anatase) having a mean particle size of 18 nm (manufactured by Catalyst & Chemicals Ind. Co. Ltd.; HPW-18NR) at the weight ratios shown in Table 2 (Comparative Example 2 uses only titanium oxide particles, and Example 11 uses only the titanium oxide structure). 10 parts by weight of ethyl cellulose and 70 parts by weight of α-terpineol were added to 20 parts by weight of each of the resulting mixtures, and the mixture was kneaded with a three-roll mill to prepare a paste.

This paste was applied to a glass substrate with a transparent electrode using a screen printer, and fired for 1 hour at 500° C., thereby preparing an electrode film with a film thickness of 12 μm.

The glass substrate with the electrode film was immersed for 18 hours at room temperature in a dehydrated ethanol solution of $5 \times 10^4$ mol/L of a ruthenium complex $(RuL_2(NCS)_2)$ dye (N3 dye), and then dried to prepare an oxide porous electrode.

Next, a counter electrode made of a platinum-plated glass substrate with a transparent electrode was laminated to the oxide porous electrode via a spacer. An electrolytic solution made of 0.6 mol/L of an anhydrous acetonitrile solution of lithium iodide and 0.06 mol/L of an anhydrous acetonitrile solution of iodine was injected between the electrodes, thereby preparing a photoelectric conversion element.

Experimental Example 6

Each of the prepared photoelectric conversion elements having an area of 0.25 cm² was irradiated with light having an intensity of 100 mW/cm² under conditions of AM 1.5 (rank A as defined by JISC8912), using a solar simulator manufactured by Yamashita Denso Corporation, and photoelectric conversion characteristics were evaluated.

The results are shown in Table 2.

TABLE 2

| Experiment No. | Titanium Oxide Structure: Titanium Oxide Particles (wt %) | Photoelectric Conversion Efficiency (%) |
| --- | --- | --- |
| Comp. Ex. 2 | 0:100 | 3.0 |
| Ex.6 | 2:98 | 4.9 |
| Ex.7 | 10:90 | 5.2 |
| Ex.8 | 20:80 | 6.2 |
| Ex.9 | 50:50 | 5.5 |
| Ex.10 | 80:20 | 5.0 |
| Ex.11 | 100:0 | 4.2 |

The samples of Examples 6 to 11 comprising titanium oxide structures of the invention exhibited photoelectric conversion efficiencies higher than that of the sample of Comparative Example 1. Furthermore, the samples of Examples 6 to 10 comprising porous titanium oxide compositions of the invention exhibited photoelectric conversion characteristics higher than that of the sample of Example 11 comprising a titanium oxide structure of the invention alone. Compared to the sample of Example 11, the samples of Examples 6 to 10 also exhibited great ease of application of the compositions and high covering-film strengths, thus achieving reduced costs. The samples of Examples 6 to 10 were therefore found to be superior to the sample of Example 11.

Experimental Example 7

Measurement of the pore size distribution of the electrode film obtained in Comparative Example 2 using a specific surface area/pore size distribution measuring apparatus showed a pore size distribution mainly in the range of 3 to 6 nm, with a mode of 4 nm (5 to 50 nm pores: 12%).

Measurement of the pore size distribution of the electrode film obtained in Example 9 in the same manner showed a pore size distribution mainly in the range of 10 to 50 nm, with a mode of 30 nm (5 to 50 nm pores: 91%).

It is believed that the diffusion of ions of the electrolytic solution was inhibited in the sample of Comparative Example 2, whereas the diffusion of ions occurred smoothly in the sample of Example 9 having an appropriate pore size distribution, partly contributing to the improved photoelectric conversion efficiency.

Moreover, measurement of the pore size distribution of the electrode film obtained in Example 11 in the same manner showed a pore size distribution mainly in the range of 20 to 100 nm, with a mode of 80 nm (5 to 50 nm pores: 13%).

It is thus understood that, even when compared to the sample of Example 11, the sample of Example 9 is excellent in both conductivity and diffusion of ions of the electrolytic solution.

REFERENCE SIGNS LIST

100: A TEM image of the lengthwise direction of a nanoflake carbon tube
110: Substantially linear graphene sheet images
200: A TEM image of a cross section substantially perpendicular to the lengthwise direction of a nanoflake carbon tube
210: Arc-shaped graphene sheet images
300: Linear graphene sheet images that are continuous over the entire length in the lengthwise direction of a nested multi-walled carbon nanotube

400: A TEM image of a cross section perpendicular to the lengthwise direction of a nested multi-walled carbon nanotube

The invention claimed is:

1. A photoelectric conversion element comprising a dye deposited on a surface of an active material, the active material comprising a titanium oxide structure being rod-shaped, tubular, or fibrous, wherein
the structure comprised titanium oxide particles (1a),
the titanium oxide particles (1a) comprise anatase titanium oxide,
each titanium oxide particle of the titanium oxide particles (1a) are in close contact to each other, and
fine irregularities are present on a surface of the structure.

2. The photoelectric conversion element according to claim 1, wherein the titanium oxide particles (1a) have a mean particle size of 1 to 200 nm.

3. The photoelectric conversion element according to claim 1, wherein the titanium oxide structure has a mean diameter of 5 to 500 nm perpendicular to a long axis, a mean long-axis length of 0.1 to 1,000 and a mean aspect ratio of 3 to 200,000.

4. The photoelectric conversion element according to claim 1, wherein the titanium oxide structure has a powder resistance of $3 \times 10^6$ Ω·m or less at a pressure of 10 MPa.

5. The photoelectric conversion element according to claim 1, wherein the titanium oxide structure is tubular.

6. The photoelectric conversion element according to claim 5, wherein the titanium oxide structure has a thickness of 2 to 500 nm.

7. The photoelectric conversion element according to claim 1, wherein the titanium oxide particles (1a) further comprise at least one member selected from the group consisting of oxide of titanium (II) and oxide of titanium (III).

8. The photoelectric conversion element according to claim 1, wherein the titanium oxide particles (1a) comprise a titanium oxide having a crystalline form of a Magneli-phase structure.

9. The photoelectric conversion element according to claim 1, wherein the titanium oxide structure has a specific surface area of 20 m$^2$/g or more.

10. The photoelectric conversion element according to claim 1, wherein fine irregularities are present on an entire surface of the structure.

11. The photoelectric conversion element according to claim 1, wherein the titanium oxide particles (1a) further comprise rutile titanium oxide, brookite titanium oxide or both.

12. The photoelectric conversion element according to claim 1, wherein the titanium oxide structure has a specific surface area of 80 m$^2$/g to 3,000 m$^2$/g.

13. The photoelectric conversion element according to claim 1, wherein the titanium oxide particles (1a) are in close contact to each other over the entire length of the rod-shaped, tubular or fibrous titanium oxide structure.

14. A process for producing a photoelectric conversion element comprising the steps of:
depositing a dye on a surface of an active material, the active material comprising the titanium oxide structure of claim 1;
wherein forming the titanium oxide structure comprises the steps of:
(A) forming a covering layer comprising titanium oxide particles (1a) connected to one another on a surface of a rod-shaped or fibrous nanoscale carbon by performing a precipitation reaction from a fluorotitanate complex, thereby preparing nanoscale carbon covered with titanium oxide; and
(B) removing the nanoscale carbon present in the nanoscale carbon covered with titanium oxide.

15. The process for producing the photoelectric conversion element according to claim 14, wherein 70 to 100% of the surface of the nanoscale carbon is covered with the titanium oxide particles, as measured by electron microscopic observation.

* * * * *